(12) United States Patent
Son et al.

(10) Patent No.: US 7,773,183 B2
(45) Date of Patent: Aug. 10, 2010

(54) METHOD FOR MANUFACTURING AN IN-PLANE SWITCHING MODE LIQUID CRYSTAL DISPLAY DEVICE

(75) Inventors: Hyeon Ho Son, Anyang-shi (KR); Won Ho Lee, Seongnam-shi (KR)

(73) Assignee: LG Display Co., Ltd., Seoul (KR)

( * ) Notice: Subject to any disclaimer, the term of this patent is extended or adjusted under 35 U.S.C. 154(b) by 61 days.

(21) Appl. No.: 12/320,489

(22) Filed: Jan. 27, 2009

(65) Prior Publication Data

US 2009/0148974 A1 Jun. 11, 2009

Related U.S. Application Data

(62) Division of application No. 11/080,638, filed on Mar. 16, 2005, now Pat. No. 7,502,086.

(30) Foreign Application Priority Data

Mar. 16, 2004 (KR) ..................... 10-2004-0017631

(51) Int. Cl.
*G02F 1/1343* (2006.01)
(52) U.S. Cl. .................. 349/141; 349/143; 349/187
(58) Field of Classification Search .......... 349/141–144
See application file for complete search history.

(56) References Cited

U.S. PATENT DOCUMENTS

| | | | |
|---|---|---|---|
| 5,598,285 A * | 1/1997 | Kondo et al. .................. 349/39 |
| 5,886,762 A | 3/1999 | Lee et al. | |
| 6,088,078 A | 7/2000 | Kim et al. .................... 349/141 |
| 6,128,061 A | 10/2000 | Lee et al. ..................... 349/141 |
| 6,188,459 B1 | 2/2001 | Kim | |
| 6,233,034 B1 | 5/2001 | Lee et al. | |
| 6,266,118 B1 | 7/2001 | Lee et al. | |
| 6,281,958 B1 | 8/2001 | Nakajima | |
| 6,452,657 B1 | 9/2002 | Suzuki et al. ............... 349/141 |
| 6,674,932 B1 | 1/2004 | Zhang et al. | |
| 6,757,042 B2 | 6/2004 | Lee et al. | |
| 2004/0095542 A1* | 5/2004 | Shim et al. .................. 349/141 |

FOREIGN PATENT DOCUMENTS

| | | |
|---|---|---|
| JP | 11-125835 | 5/1999 |
| KR | 100265572 | 6/2000 |

* cited by examiner

*Primary Examiner*—Richard H Kim
(74) *Attorney, Agent, or Firm*—McKenna Long & Aldridge LLP

(57) ABSTRACT

In an IPS mode LCD device and method, a plurality of sub-blocks are utilized to maintain a maximum transmittance even when a voltage above a predetermined value is applied to the device. The IPS mode LCD device includes a common electrode including a plurality of first segments and a plurality of second segments to define a plurality of blocks, wherein the plurality of first segments are formed substantially parallel to the gate line in the pixel region, and the plurality of second segments are formed substantially parallel to the data line, and connected to the first segments; and a pixel electrode including a plurality of third segments and at least one fourth segment, and being connected with a drain electrode of the thin film transistor, wherein each of the third segments is positioned between the first segments, and the at least one fourth segment connects the third segments.

21 Claims, 17 Drawing Sheets

METHOD FOR MANUFACTURING AN IN-PLANE SWITCHING MODE LIQUID CRYSTAL DISPLAY DEVICE

This application is a Divisional of application Ser. No. 11/080,638 filed Mar. 16, 2005, now U.S. Pat. No. 7,502,086 now allowed; which claims priority to Korean Patent Application No. 10-2004-0017631, filed May 16, 2004 all of which are hereby incorporated by reference for all purposes as if fully set forth herein.

BACKGROUND OF THE INVENTION

1. Field of the Invention

The present invention relates to a liquid crystal display (LCD) device. More particularly, the invention relates to an In-Plane Switching mode liquid crystal display (IPS mode LCD) device and a method for manufacturing the same to maximize an aperture ratio.

2. Discussion of the Related Art

Recently, liquid crystal display (LCD) devices have been actively studied and researched because of its advantageous characteristics such as high contrast ratio, great gray level, high picture quality and low power consumption. The LCD device is especially suitable for an ultra-thin display device such as a wall-mountable television. Also, the LCD device has attracted great attention as a new display device that can be substitute for a CRT in that the LCD device has thin profile, lightweight and low power consumption. For example, the LCD device may be used for a display of a notebook computer being operated by a battery. Additionally, the LCD device fabricated as a small panel may be widely used for a display of a mobile phone.

The LCD device has various modes according to the properties of liquid crystal and pattern structures. More specifically, the LCD device may be categorized into a Twisted Nematic (TN) mode of controlling liquid crystal director by applying a voltage after arrangement of liquid crystal director twisted at 90°, a multi-domain mode of obtaining a wide viewing angle by dividing one pixel into several domains, an Optically Compensated Birefringence (OCB) mode of compensating a phase change of light according to a progressing direction of light by forming a compensation film on an outer surface of a substrate, an In-Plane Switching (IPS) mode of forming an electric field substantially parallel to two substrates by forming two electrodes on any one substrate, and a Vertical Alignment (VA) mode of arranging a longitudinal (major) axis of liquid crystal molecule vertical to a plane of an alignment layer by using a negative type liquid crystal and a vertical alignment layer.

Among the various types of LCD devices, the IPS mode LCD device generally includes a color filter array substrate, a thin film transistor TFT array substrate, and a liquid crystal layer, wherein the color filter array substrate and the thin film transistor array substrate are positioned to oppose each other, and the liquid crystal layer is formed between the two substrates. The color filter array substrate includes a black matrix layer for preventing light leakage, and an R/G/B color filter layer for realizing various colors on the black matrix layer. Also, the thin film transistor TFT array substrate includes gate and data lines crossing each other to define a pixel region, a switching device formed at a crossing point of the gate and data lines, and common and pixel electrodes alternately formed to generate an electric field substantially parallel to the two substrates.

A related art EPS mode LCD device will be described with reference to the accompanying drawings. FIG. 1 is a plan view illustrating a related art IPS mode LCD device. FIG. 2 is a cross sectional view of an IPS mode LCD device along I-I' of FIG. 1. FIG. 3 is a voltage distribution of an IPS mode LCD device along II-II' of FIG. 1. FIG. 4A and FIG. 4B are plan views illustrating an IPS mode LCD device when a voltage is turned on/off. FIG. 5 is a graph illustrating the voltage-transmittance (V-T) characteristics of a related art IPS mode LCD device.

Hereinafter, the related art IPS mode LCD device will be described with reference to FIG. 1 and FIG. 2. First, a thin film transistor TFT array substrate 11 includes a gate line 12, a data line 15, and a thin film transistor TFT. In this state, a gate insulating layer 13 is interposed between the gate line 12 and the data line 15, wherein the gate line 12 is formed substantially perpendicular to the data line 15 to define a unit pixel region. Also, the thin film transistor TFT is formed at a crossing point of the gate line 12 and the data line 15. The thin film transistor TFT is comprised of a gate electrode 12a, the gate insulating layer 13, a semiconductor layer 14, and source/drain electrodes 15a/15b. The gate electrode 12a extends from the gate line 12, and the gate insulating layer 13 is formed on an entire surface of the thin film transistor TFT array substrate 11 including the gate electrode 12a. Also, the semiconductor layer 14 is formed on the gate insulating layer 13 above the gate electrode 12a. Then, the source/drain electrodes 15a/15b, extending from the data line 15, are overlapped with both sides of the semiconductor layer 14.

In each pixel region, there are a common line 25, a plurality of common electrodes 24, and a plurality of pixel electrodes 17. The common line 25 is formed substantially parallel to the gate line 12 within the pixel region. The plurality of common electrodes 24, extending from the common line 25, are formed substantially parallel to the data line 15 within each pixel region. Also, the plurality of pixel electrodes 17 are connected to the drain electrode 15b of the thin film transistor TFT through a passivation layer 16 in each pixel region, wherein each pixel electrode 17 alternates with each common electrode 24 in parallel.

A color filter array substrate 21 includes a black matrix layer 22, and a color filter layer 23 of red(R)/green(G)/blue (B). The black matrix layer 22 is formed on the color filter array substrate 21 corresponding to a remaining portion of the substrate that does not include the pixel region of the thin film transistor TFT array substrate 11, for preventing light leakage. Also, the color filter layer 23 of R/G/B is formed to correspond to the pixel region between patterns of the black matrix layer 22, to display colors.

Next, the thin film transistor TFT array substrate 11 and the color filter array substrate 21 are bonded to each other by a sealant (not shown) of an adhesive, and then a liquid crystal layer 31 is formed between the thin film transistor TFT array substrate 11 and the color filter array substrate 21. In addition, alignment layers 30a and 30b are formed on inner surfaces of the thin film transistor TFT array substrate 11 and the color filter array substrate 21 having the various patterns, thereby initially aligning liquid crystal molecules of the liquid crystal layer 31.

In the aforementioned IPS mode LCD device, the common electrode 24 and the pixel electrode 17 are formed on the same substrate, to align the liquid crystal molecules in substantially parallel to the substrates. In this state, if a voltage is applied between the two electrodes, an electric field E generates substantially parallel to the substrates. Accordingly, it is possible to decrease the change on birefringence of the liquid crystal to a direction of viewing angle, thereby realizing a wider viewing angle, as compared with a related art TN mode LCD device.

Specifically, as shown in FIG. 3, if 6V is applied to the common electrode 24, and 0V is applied to the pixel electrode 17, an equipotential surface is formed substantially parallel to the electrodes at the portions right on the electrodes, and the equipotential surface is formed in perpendicular to the electrodes at the portion between the two electrodes. Thus, since the electric field is perpendicular to the equipotential surface, a horizontal electric field is formed between the common electrode 24 and the pixel electrode 17, a vertical electric field is formed on the respective electrodes, and both the horizontal and vertical electric fields are complexly formed in the side of the electrodes.

An alignment of liquid crystal molecules in the related art IPS mode LCD device is controlled with the electric field. For example, as shown in FIG. 4A, if a sufficient voltage is applied to the liquid crystal molecules 32 initially aligned at a same direction as a transmission axis of one polarizing sheet, long axes of the liquid crystal molecules 32 are aligned substantially parallel to the electric field. In case the dielectric anisotropy of liquid crystal is negative, short axes of the liquid crystal molecules are aligned substantially parallel to the electric field.

At this time, first and second polarizing sheets are formed on outer surfaces of the thin film transistor TFT array substrate and the color filter array substrate bonded to each other, wherein the transmission axes of the first and second polarizing sheets are positioned perpendicular to each other. Also, the alignment layer is rubbed parallel to the transmission axis of one polarizing sheet, whereby it is displayed on a normally black mode. In the case of a normally black mode, if a voltage is not applied to the device, as shown in FIG. 4A, the liquid crystal molecules 32 are maintained in the initial alignment state, thereby displaying the black state. In the meantime, as shown in FIG. 4B, if a voltage is applied to the device, the liquid crystal molecules 32 are aligned in parallel to the electric field, thereby displaying a white state.

When the liquid crystal molecules 32 are re-aligned with being rotated at the direction of 45°, it is possible to realize the maximum transmittance in the device. However, if a high voltage above a predetermined value is applied to the device, the liquid crystal molecules 32 are re-aligned at the direction above 45°, so that the liquid crystal molecules 32 have the strong property for being aligned in parallel to the horizontal electric field, thereby decreasing the transmittance. That is, as shown in FIG. 5, on the assumption that the maximum voltage applied to the IPS mode LCD device is about 10V, the maximum transmittance is obtained when 6V is applied to the device, and the transmittance is lowered when the voltage above 6V is applied to the device.

SUMMARY OF THE INVENTION

Accordingly, the present invention is directed to an IPS mode LCD device and a method for manufacturing the same that substantially obviates one or more problems due to limitations and disadvantages of the related art.

An advantage of the present invention is to provide an IPS mode LCD device and a method for manufacturing the same, in which each pixel region includes a plurality of sub-blocks defined by common and pixel electrodes, so that it is possible to maintain a maximum transmittance even in a case of applying a voltage above a predetermined value to the device.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these advantages and in accordance with the purpose of the invention, as embodied and broadly described herein, an IPS mode LCD device includes a gate line and a data line crossing each other on a first substrate to define a unit pixel region; a thin film transistor at a crossing point of the gate line and the data line; a common electrode including a plurality of first segments and a plurality of second segments to define a plurality of blocks, wherein the plurality of first segments are formed substantially parallel to the gate line in the pixel region, and the plurality of second segments are formed substantially parallel to the data line and connected to the first segments; and a pixel electrode including a plurality of third segments and at least one fourth segment, and being connected with a drain electrode of the thin film transistor, wherein each of the third segments is positioned between the first segments, and the at least one fourth segment connects the third segments.

In another aspect, a method for manufacturing an IPS mode LCD device includes forming a gate line on a substrate; forming a common electrode including a plurality of first segments and a plurality of second segments in a pixel region, wherein the plurality of first segments are formed substantially parallel to the gate line, and the plurality of second segments are formed substantially perpendicular to the gate line and connected to the first segments; forming a gate insulating layer on an entire surface of the substrate including the gate line and the common electrode; forming a semiconductor layer on the gate insulating layer; forming a data line substantially perpendicular to the gate line, and forming source/drain electrodes overlapped with sides of the semiconductor layer; forming a passivation layer on the entire surface of the substrate including the data line, wherein the passivation layer has a contact hole on the drain electrode; and forming a pixel electrode including a plurality of third segments and at least one fourth segment on the passivation layer connected with the drain electrode, wherein each of the third segments is positioned between the first segments, and the at least one fourth segment connects the third segments.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8A and FIG. 8B illustrate an operation of an IPS mode LCD device having an electrode of a grid structure according to the first embodiment of the present invention when a voltage is turned on;

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
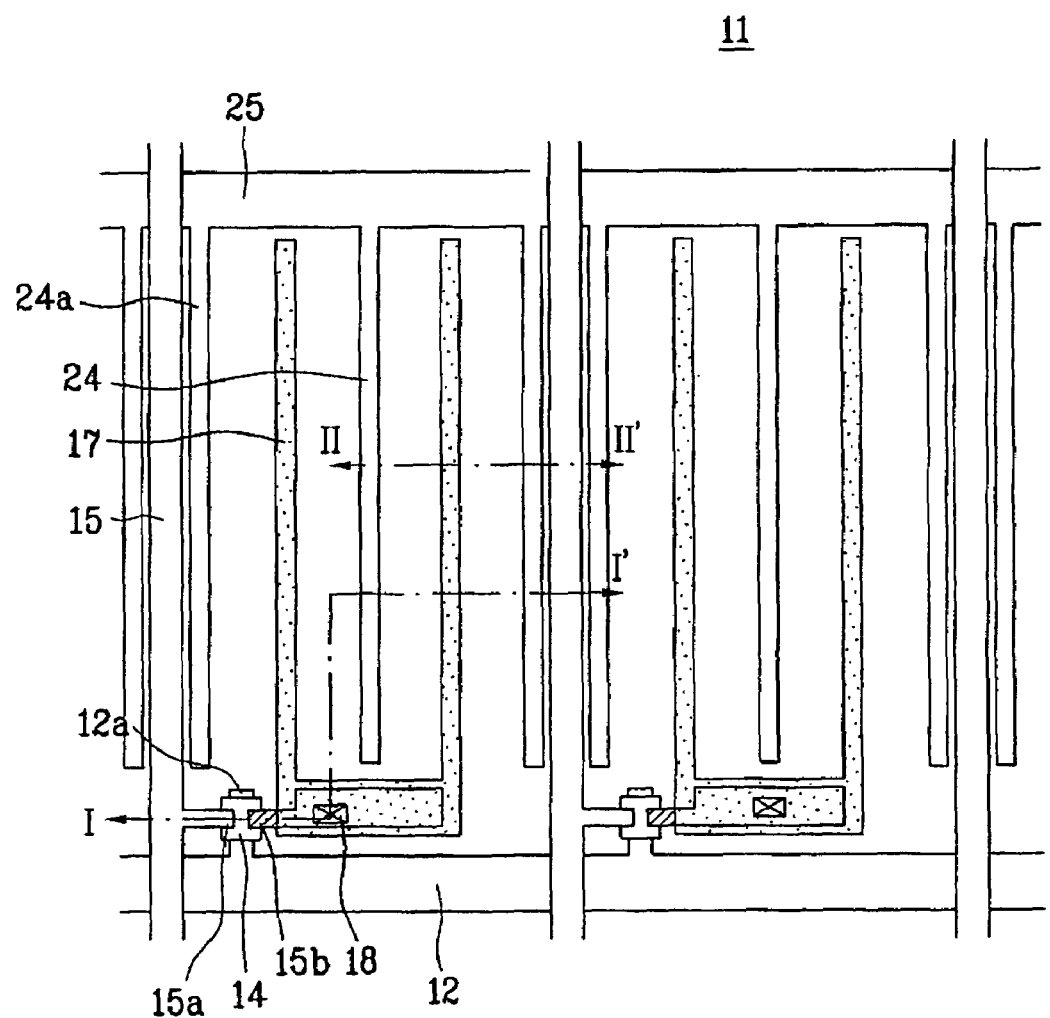
FIG. 1 is a plan view illustrating a related art IPS mode LCD device.
Figure 2:
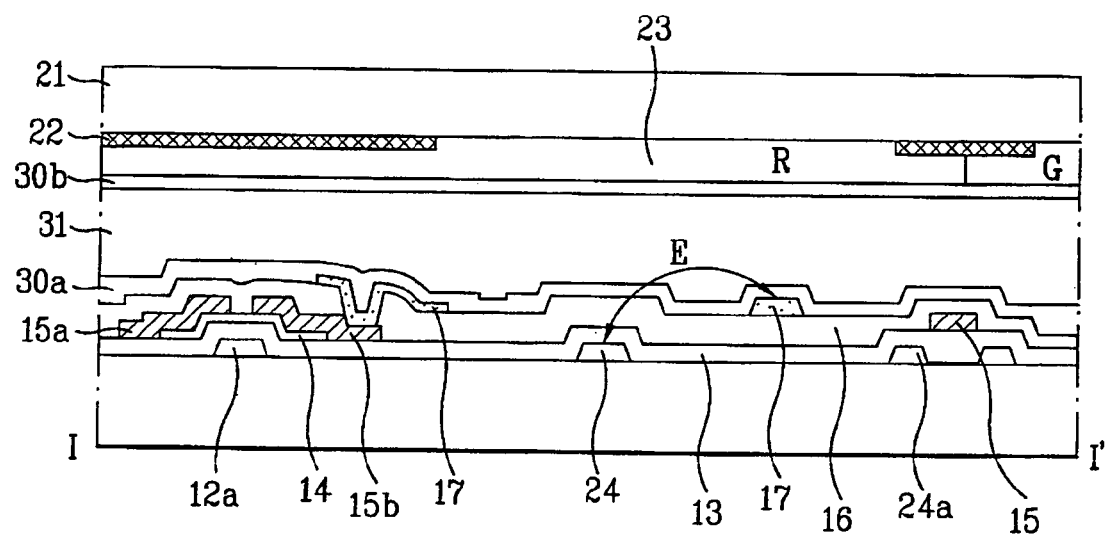
FIG. 2 is a cross sectional view of an IPS mode LCD device along I-I' of FIG. 1.
Figure 3:
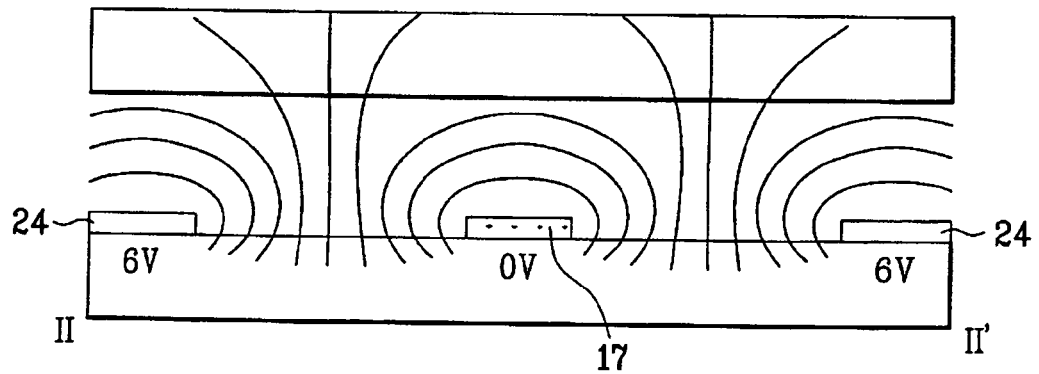
FIG. 3 is a voltage distribution of an IPS mode LCD device along II-II' of FIG. 1.
Figure 4A:
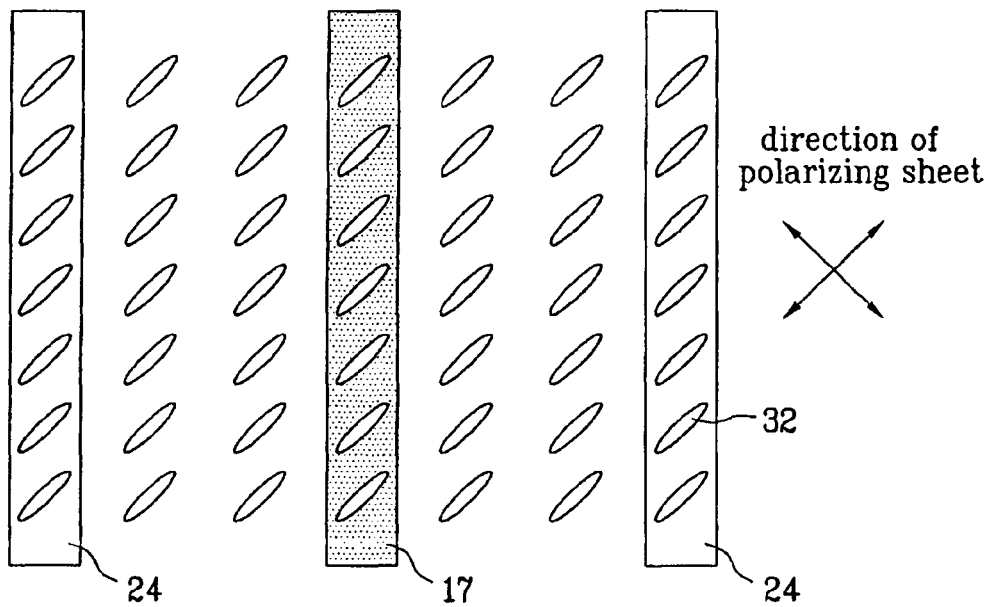
FIG. 4A and FIG. 4B are plan views of an IPS mode LCD device when a voltage is turned on/off.
Figure 4B:
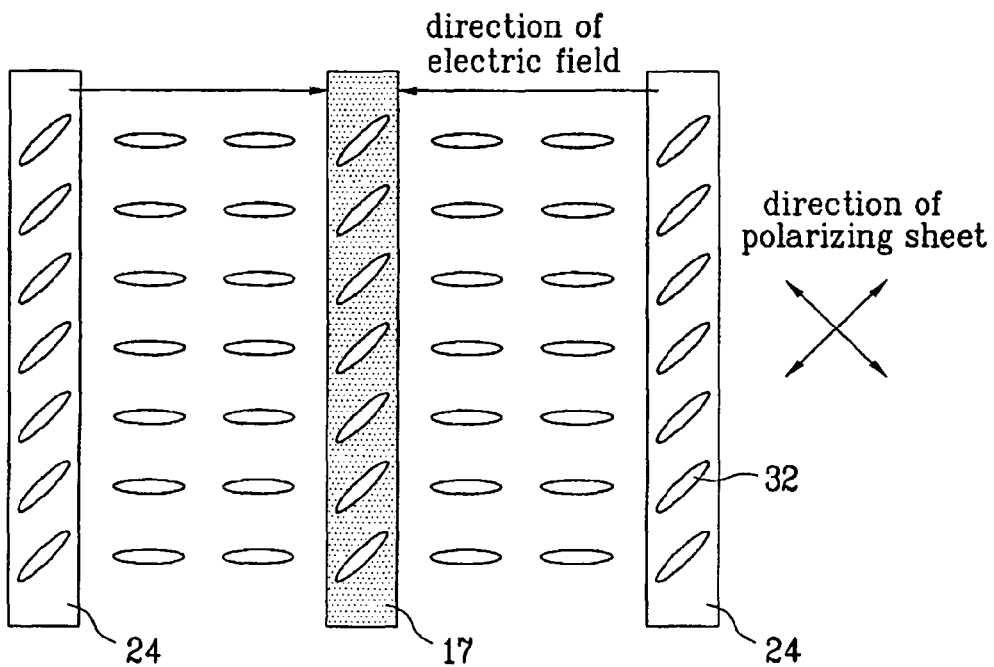
Figure 5:
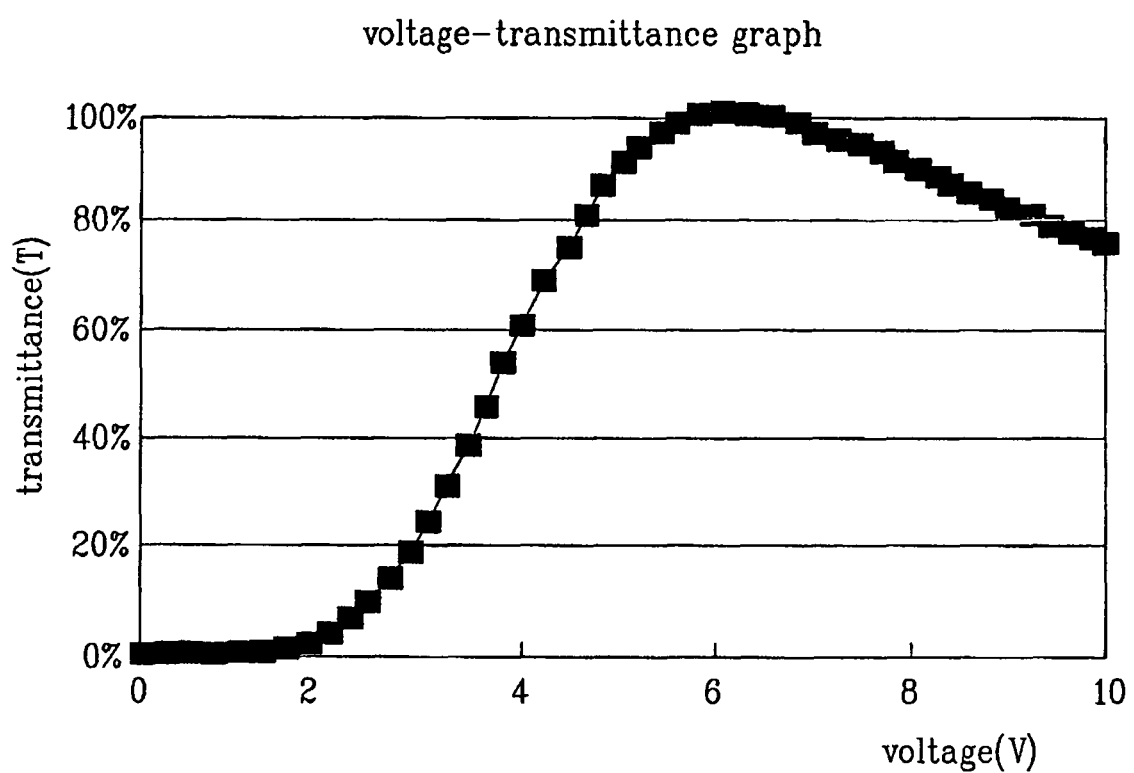
FIG. 5 is a graph of illustrating the voltage-transmittance (V-T) characteristics of a related art IPS mode LCD device.
Figure 6:
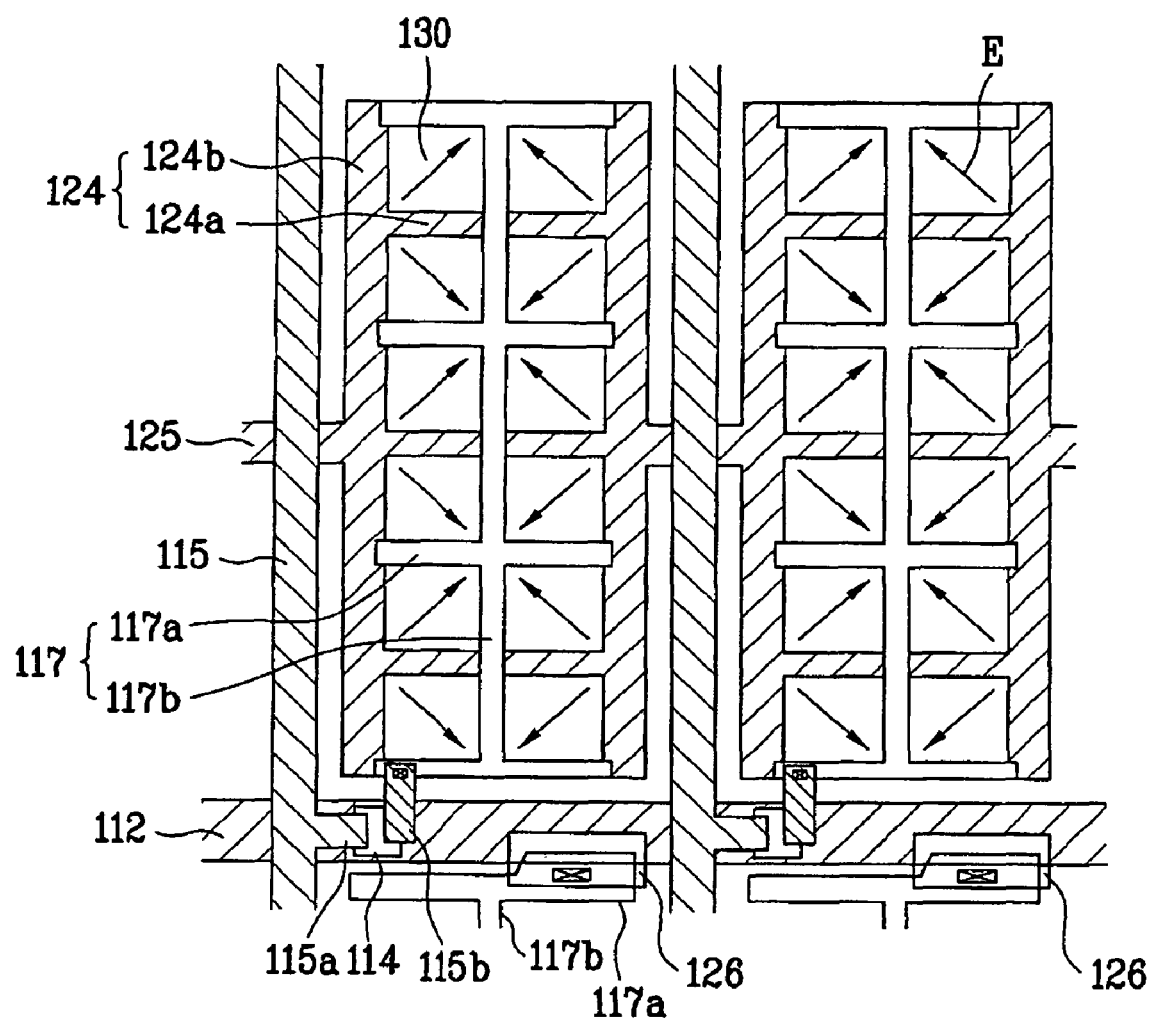
FIG. 6 is a plan view of an IPS mode LCD device having an electrode of a grid structure according to the first embodiment of the present invention.
Figure 7A:
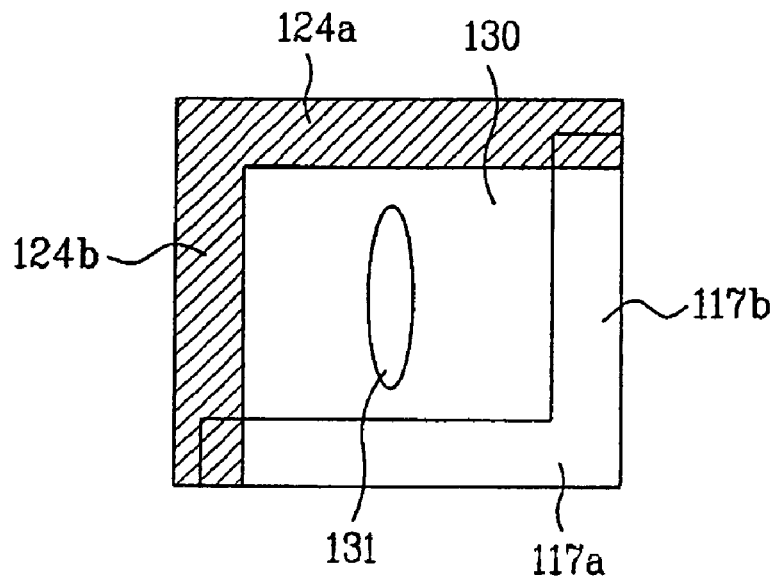
FIG. 7A and FIG. 7B illustrate an operation of an IPS mode LCD device having an electrode of a grid structure according to the first embodiment of the present invention when a voltage is turned off.
Figure 7B:
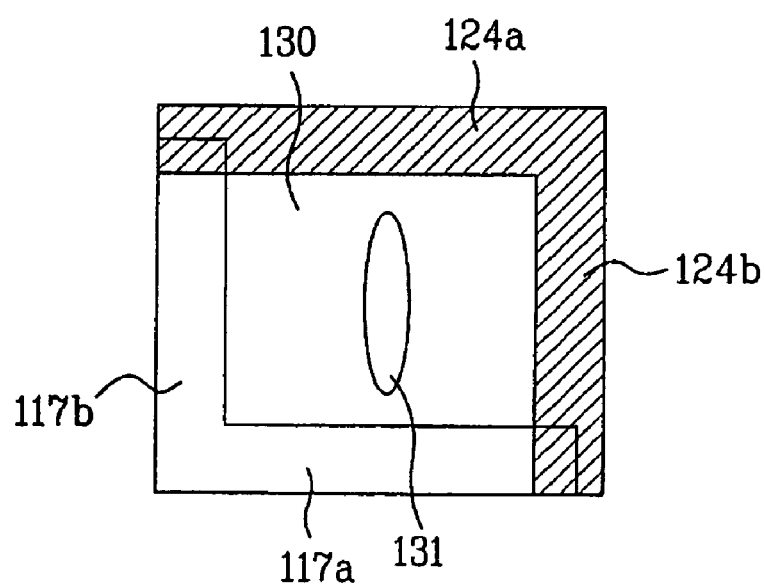
Figure 8A:
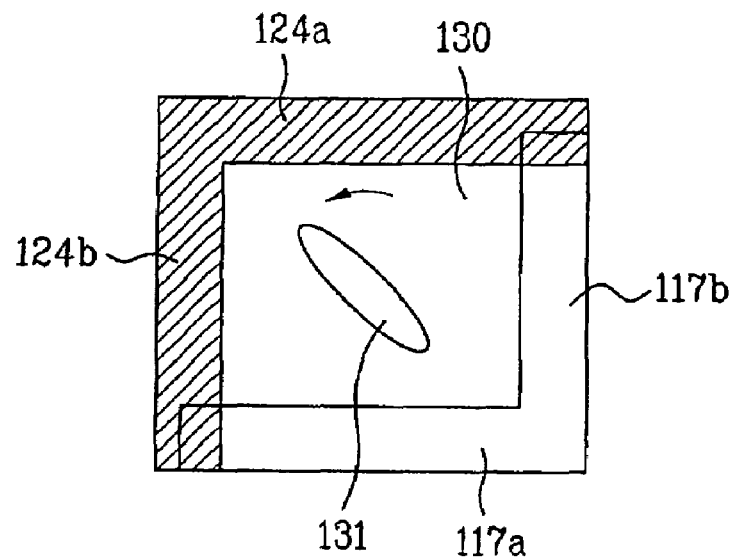
Figure 8B:
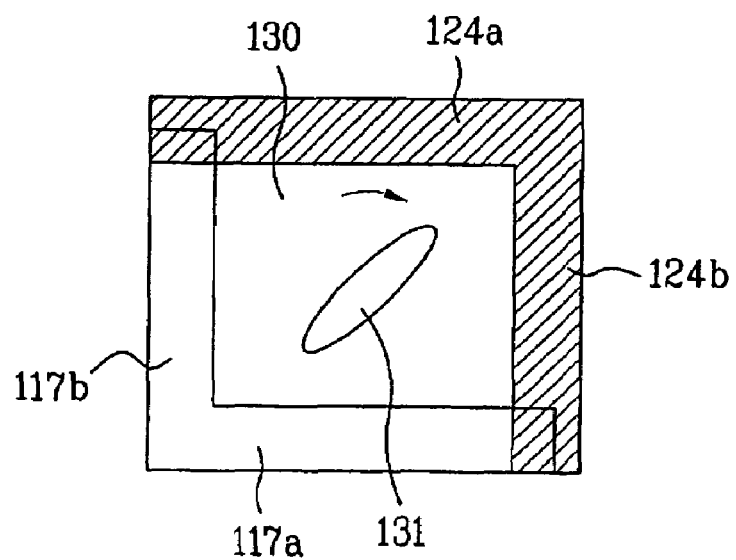
Figure 9:
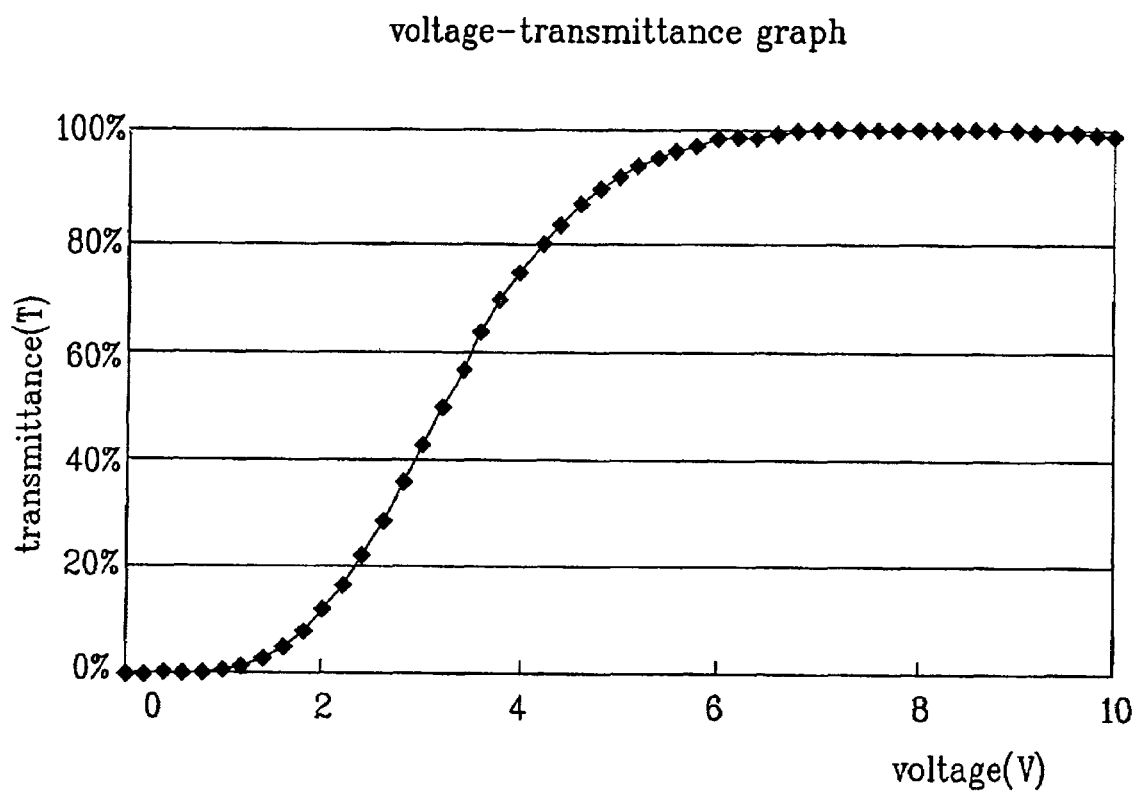
FIG. 9 is a graph of illustrating the voltage-transmittance (V-T) characteristics of an IPS mode LCD device having an electrode of a grid structure according to the first embodiment of the present invention.

Hereinafter, a thin film transistor TFT array substrate of an IPS mode LCD device according to the present invention will be chiefly described with reference to the accompanying drawings. FIG. 6 is a plan view of an IPS mode LCD device having an electrode of a grid structure according to the first embodiment of the present invention. FIG. 7A and FIG. 7B illustrate an operation of an IPS mode LCD device having an electrode of a grid structure according to the first embodiment of the present invention when a voltage is turned off. FIG. 8A and FIG. 8B illustrate an operation of an IPS mode LCD device having an electrode of a grid structure according to the first embodiment of the present invention when a voltage is turned on. FIG. 9 is a graph of illustrating the voltage-transmittance (V-T) characteristics of an IPS mode LCD device having an electrode of a grid structure according to the first embodiment of the present invention.

An IPS mode LCD device having an electrode of a grid structure according to the first embodiment of the present invention will be described as follows. As shown in FIG. 6, a plurality of gate lines 112 are formed along one direction on a thin film transistor TFT array substrate, and a plurality of data lines 115 are formed substantially perpendicular to the gate lines 112, thereby defining a plurality of pixel regions. Then, a thin film transistor TFT is formed at a crossing point of the gate and data lines 112 and 115 in each pixel region, wherein the thin film transistor TFT switches a voltage. Also, a common electrode 124 is formed diagonally and symmetric with a pixel electrode 117, wherein the common electrode 124 and the pixel electrode 117 having a shape of "⌐" or "∟" are repetitively positioned in a grid structure. Then, a common line 125 is additionally formed to apply a common signal by connecting the common electrodes 124 of adjacent pixel regions.

Each pixel region may be divided into a plurality of blocks 130 by the common electrode 124 and the pixel electrode 117. More specifically, in each pixel region, the common electrode 124 includes a plurality of first segments 124a and a plurality of second segments 124b. The plurality of first segments 124a are positioned at fixed intervals substantially in parallel to the gate line 112. Also, the plurality of second segments 124b are positioned substantially parallel to the data line 115 and connected with the plurality of first segments 124a. In the IPS mode LCD device according to the first embodiment of the present invention, the second segments 124b are connected to both sides in each first segment 124a. The second segment 124b of the pixel region adjacent to the data line 115 prevents light from leaking in the edge of the data line 115.

Also, the pixel electrode 117 includes a plurality of third segments 117a and at least one fourth segment 117b. The plurality of third segments 117a are formed substantially parallel to the gate line 112, wherein each third segment 117a is positioned between the first segments 124a of the common electrode 124. Also, at least one fourth segment 117b or the third segment 117a is formed between the second segments 124b in parallel, wherein the fourth segment 117b connects the third segments 117a to one another. The fourth segment 117b of the pixel electrode 117 is connected to the drain electrode 115b of the thin film transistor TFT, whereby the fourth segment 117b receives a pixel signal. The third/fourth segments 117a/117b of the pixel electrode 117 are respectively positioned at a predetermined interval from the first/second segments 124a/124b of the common electrode 124, in parallel. Accordingly, the respective blocks 130 are defined by cross-arranging the first/second segments 124a/124b of the common electrode 124 with the third/fourth segments 117a/117b of the pixel electrode 117. Also, the respective blocks 130 may be formed, for example, in a regular tetragonal shape or a rectangular shape, wherein the respective blocks 130 have the same size.

When the fourth segment 117b of the pixel electrode 117 is overlapped with the adjacent gate line 112, a storage capacitor may be formed at the overlapped portion of the gate line 112 and the pixel electrode 117. Also when an additional storage electrode 126 is formed on the gate line 112, a storage capacitor may be formed in a method of connecting the storage electrode 126 with the pixel electrode 117. The storage capacitor is comprised of a gate insulating layer (not shown) interposed between the gate line 112 and the storage electrode 126. In order to obtain more storage capacitance, it is necessary to increase the area of the gate line 112 and the storage electrode 126, whereby an aperture ratio is lowered as much as the area of the gate line 112 and the storage electrode 126 increases.

As a voltage is applied to the aforementioned IPS mode LCD device according to the first embodiment of the present invention, an electric field E is generated between the common electrode 124 and the pixel electrode 117. For example, if 6V is applied to the common electrode 124, and 0V is applied to the pixel electrode 117, an electric field E is generated at an angle from the common electrode 124 to the pixel electrode 117. That is, the electric field E is formed at the direction of 45° or 135° with respect to the first segment 124a of the common electrode 124 and the third segment 117a of the pixel electrode 117.

Accordingly, as shown in FIG. 8A and FIG. 8B, liquid crystal molecules 131 are re-aligned by the electric field E. That is, the liquid crystal molecules 131 are re-aligned at the direction of 45° (FIG. 8B) or 135° (FIG. 8A), with respect to the first segment 124a of the common electrode 124 and the third segment 117a of the pixel electrode 117. At this time, as shown in FIG. 7A and FIG. 7B, the liquid crystal molecules 131 are initially aligned at the direction of the fourth segment 117b of the pixel electrode 117 by an alignment layer (not shown). Also, the liquid crystal molecules 131 may be initially aligned at the direction of the third segment 117a of the pixel electrode 117. Thus, the liquid crystal molecules 131 are re-aligned at two directions of 45° or 135°, so that it is possible to realize the multi-domain effect by compensating viewing angles at different directions.

In addition, the common electrode 124 and the pixel electrode 117 are symmetrically positioned to have a grid structure. Thus, even though a voltage above a predetermined value is applied to the IPS mode LCD device, an LCD panel maintains a high transmittance. That is, even if the voltage above the predetermined value is applied to the IPS mode LCD device, the liquid crystal molecules are re-aligned at the direction of 45° or 135° since the electric field E generated at the direction of 45° or 135° by the pixel electrode 117 and the common electrode 124 having a shape of "¬" or "L". Accordingly, the liquid crystal molecules are aligned at the direction of 45° or 135°, for obtaining the maximum transmittance, even though a high voltage is applied to the IPS mode LCD device. That is, the E'PS mode LCD device is maintained in a stable state for realizing the maximum transmittance, even in a case of applying a voltage above a predetermined value (FIG. 9).

Figure 10:
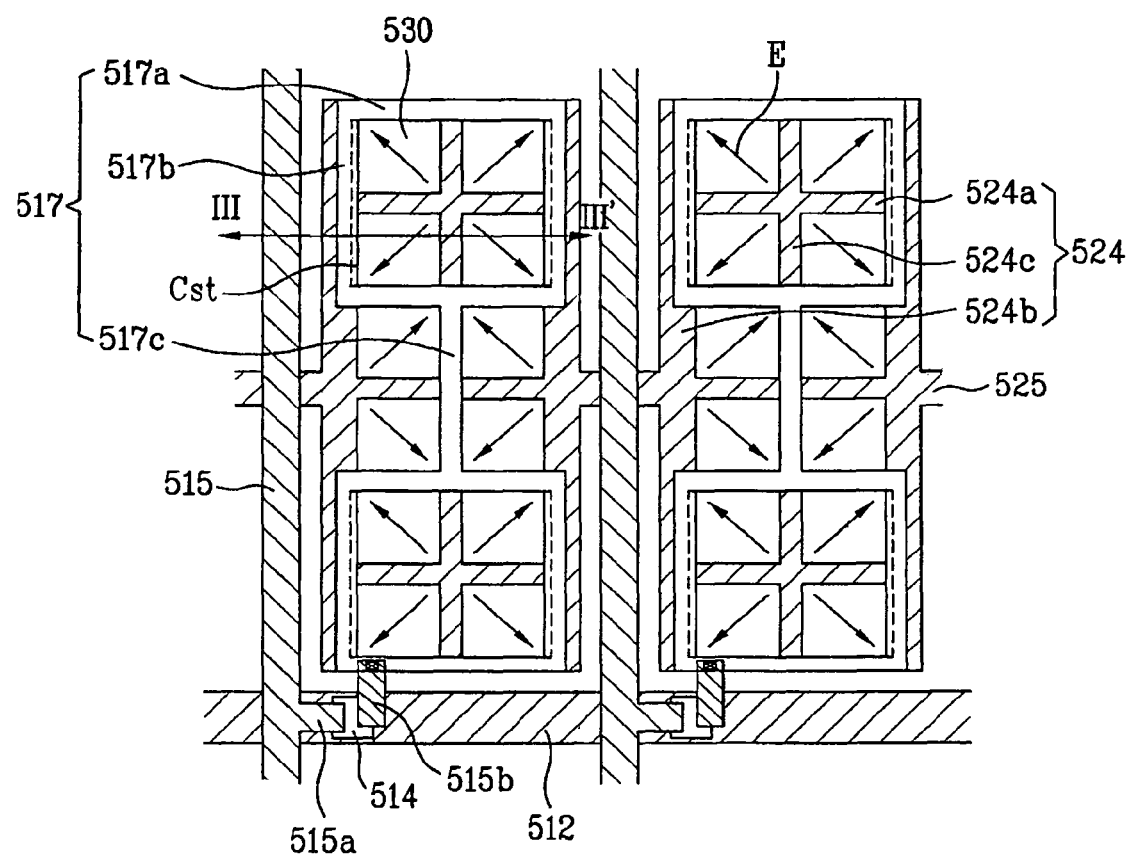
FIG. 10 is a plan view of an IPS mode LCD device according to the second embodiment of the present invention.
Figure 11:
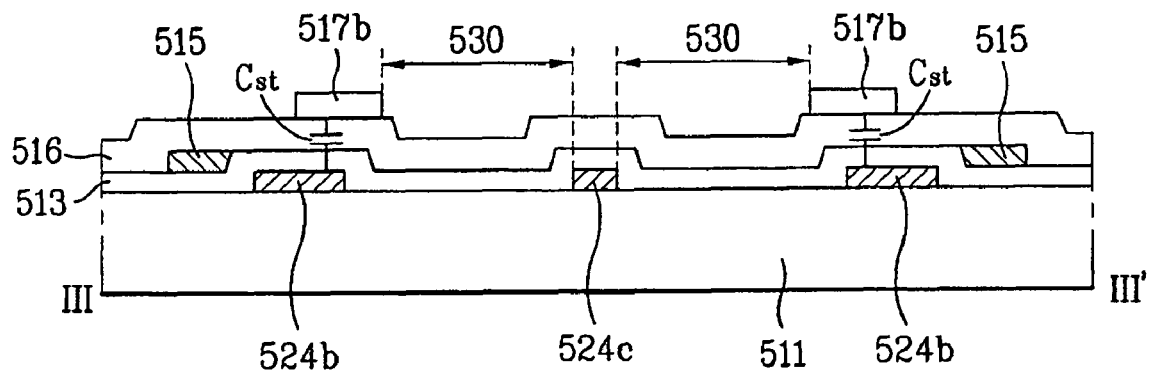
FIG. 11 is a cross sectional view of an IPS mode LCD device along III-III' of FIG. 10.
Figure 12A:
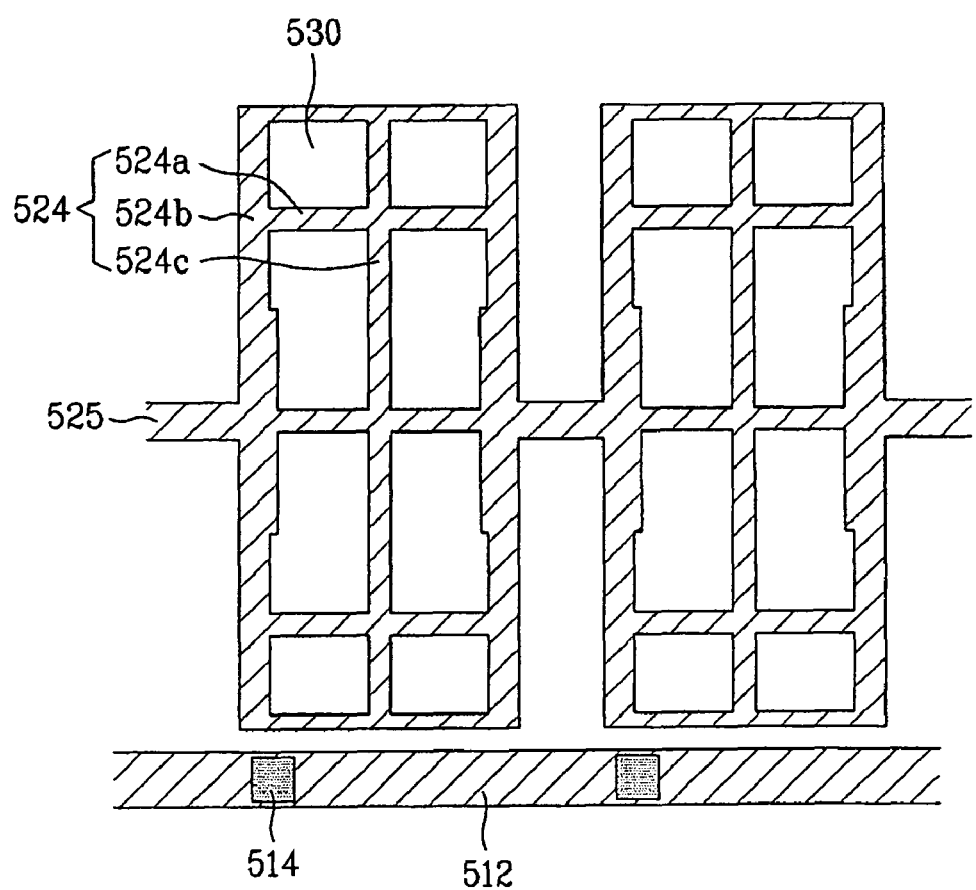
FIG. 12A and FIG. 12C are plan views of process steps for manufacturing an IPS mode LCD device according to the second embodiment of the present invention.

The common electrode and the pixel electrode may have the grid structure according to another method. FIG. 10 is a plan view of an IPS mode LCD device according to the second embodiment of the present invention. FIG. 11 is a cross sectional view of an IPS mode LCD device along III-III' of FIG. 10. FIG. 12A and FIG. 12C are plan views of process steps for manufacturing an IPS mode LCD device according to the second embodiment of the present invention.

As shown in FIG. 10 and FIG. 11, an IPS mode LCD device according to the second embodiment of the present invention includes a plurality of gate lines 512 and a plurality of data lines 515, wherein the plurality of gate lines 512 are formed substantially perpendicular to the plurality of data lines 515 on a thin film transistor TFT array substrate, to define a plurality of pixel regions. In each pixel region, there is a thin film transistor TFT, a common electrode 524, and a pixel electrode 517. The thin film transistor TFT is formed at a crossing point of the gate line 512 and the data line 515 for switching a voltage. Then, the common electrode 524 divides each pixel region into a plurality of blocks 530. Also, the pixel electrode 517 is formed in a rectangular plus shape for being partially overlapped with the common electrode 524. At this time, the common electrode 524 is formed at an optimal interval from the pixel electrode 517. To apply a common signal to the common electrode 524 inside the pixel region, a common line 525 is additionally formed for connection of the common electrodes 524 in the adjacent pixel regions. At this time, the gate line 512, the common line 525 and the common electrode 524 are formed on the same layer.

The thin film transistor TFT is formed of a gate electrode 512a, a gate insulating layer 513, a semiconductor layer 514, and source/drain electrodes 515a/515b, wherein the thin film transistor TFT switches on/off the voltage applied to the unit pixel region. At this time, the gate electrode 512a is formed from a predetermined portion of the gate line 512, and the gate insulating layer 513 is formed on an entire surface of the substrate including the gate electrode 512a. Then, an amorphous silicon (a-Si) layer and a n$^+$a-Si layer are sequentially formed on the gate insulating layer 513 above the gate electrode 512a, thereby forming the semiconductor layer 514. Herein, the n$^+$a-Si layer is formed in a method of implanting impurity ions to amorphous silicon. After that, the source/drain electrodes 515a/515b, extending from the data line 515, are formed at both sides of the semiconductor layer 514. The respective blocks 530 may be formed in a regular tetragonal shape or a rectangular shape, wherein the respective blocks 530 have the same size. The block 530 is formed by the pixel electrode 517 and the common electrode 524 in shape of "¬" or "L" with the respect to the respective blocks 530. As shown in FIG. 11, the even or odd numbered blocks 530 are provided along a horizontal direction according to the size of the pixel region.

More specifically, the common electrode 524 is formed of a plurality of first segments 524a and a plurality of second segments 524b/524c. The plurality of first segments 524a are formed substantially parallel to the gate line 512. Also, the plurality of second segments 524b/524c are formed substantially parallel to the data line 515, wherein the second segments 524b/524c electrically connect the first segments 524a to one another. The first segments 524a are positioned substantially perpendicular to the second segments 524b/524c, thereby defining the plurality of blocks 530. Also, the second segments 524b are positioned at both sides in each pixel region, and the second segment 524c is positioned in the center of the pixel region.

In this state, the second segments 524b of the common electrode 524, being positioned at both sides of the pixel region, are overlapped with an adjacent data line 515, thereby preventing light from leaking in the edge of the data line 515, and improving an aperture ratio. Also, the second segments 524b of the common electrode 524 are overlapped with the pixel electrode 517 at a minimum, whereby the overlapped portion between the second segment 524b and the pixel electrode 517 has a smaller width than that in the remaining portion of the second segment 524b not overlapped with the pixel electrode 517.

The pixel electrode 517 includes a plurality of third segments 517a and a plurality of fourth segments 517b/517c. At this time, each third segment 517a is formed between the first segments 524a of the common electrode 524 in parallel. Also, the plurality of fourth segments 517b/517c are formed substantially parallel to the data line 515b to electrically connect the third segments 517a. The fourth segment 517b is connected with two adjacent third segments 517a, and the fourth segment 517b is overlapped with the second segment 524b of the common electrode 524. Also, the fourth segment 517c is connected with the central parts of the adjacent two third segments 517a, and the fourth segment 517c is overlapped with the second segment 524c of the common electrode 524. The pixel electrode 517 is connected with the drain electrode 515b of the thin film transistor TFT, whereby the pixel electrode 517 receives a specific pixel signal.

Also, the common electrode 524 is formed diagonally and symmetric with the pixel electrode 517, wherein the common electrode 524 and the pixel electrode 517 having a shape of "¬" or "L" are repetitively positioned to form a grid structure. As a voltage of a predetermined value is applied between the common electrode 524 and the pixel electrode 517, an electric field is formed at the direction of 45° or 135°. Accordingly, liquid crystal molecules are aligned at the direction of 45° or 135° even though a voltage above a predetermined value is applied to the device. That is, it is possible to maintain a maximum transmittance in the device even if a high voltage is applied to the device.

The overlapped portion between the common electrode 524 and the pixel electrode 517 forms a storage capacitor, wherein the common electrode 524 functions as a capacitor lower electrode, and the pixel electrode 517 functions as a capacitor upper electrode that is insulated from the common electrode 524. At this time, an insulating layer is formed between the common electrode 524 and the pixel electrode 517, wherein the insulating layer is comprised of the gate insulating layer 513 formed on an entire surface of the substrate including the gate line 512, and a passivation layer 516 formed on the entire surface of the substrate including the data line 515.

That is, all the portions overlapped between the common electrode 524 and the pixel electrode 517 serve as the storage capacitor. Thus, there is no requirement for forming an additional storage electrode above the gate line 512 to form the additional storage capacitor. Even though the storage electrode is formed above the gate line 512 to obtain more storage capacitance, it is not necessary to provide the large storage electrode since a storage capacitance is generated by the overlapped portion between the common electrode 524 and the pixel electrode 517. Accordingly, it is possible to prevent the decrease on aperture ratio since there is no requirement for the increasing the area of the gate line to obtain the more storage capacitance.

Although not shown, the thin film transistor TFT array substrate is positioned opposite to another color filter array substrate, and then the two substrates are bonded to each other. In this case, first and second polarizing sheets are formed on outer surfaces of the thin film transistor TFT array substrate and the color filter array substrate. The TFT array substrate and the color filter array are bonded to each other, wherein the transmission axes of the first and second polarizing sheets are substantially perpendicular to each other. In addition, alignment layers are formed on inner surfaces of the thin film transistor TFT array substrate and the color filter array substrate. The alignment layers are aligned in parallel to the gate line or the data line, and the alignment layers are rubbed at the same direction as the polarizing axis of the first or second polarizing sheet.

A method for manufacturing the IPS mode LCD devices according to the first and second embodiments of the present invention will be described as follows. The IPS mode LCD devices according to the first and second embodiments of the present invention have the same structure except the shapes of the common electrode and the pixel electrode. Thus, the manufacturing method will be described with reference to the IPS mode LCD device according to the second embodiment of the present invention.

As shown in FIG. 12A, a metal layer having low resistivity, for example, copper Cu, aluminum Al, aluminum neodymium AlNd, molybdenum Mo, chrome Cr, titanium Ti, tantalum Ta or molybdenum-tungsten MoW, is deposited and patterned on the thin film transistor TFT array substrate to prevent a signal delay, thereby forming the plurality of gate lines 512, the common line 525, and the common electrode 524. At this time a predetermined portion of the gate line 512 functions as the gate electrode. The common line 525 is formed substantially parallel to the gate line 512. Also, the common electrode 524, extending from the common line 525, is formed to have the structure (the plurality of first and second segments) explained in FIG. 6 and FIG. 10, whereby one pixel region is divided into the plurality of blocks 530. In this case, each block 530 may be formed in a regular tetragonal shape or a rectangular shape, wherein the block 530 has a size corresponding to the designing rule for optimal interval between the electrodes. Also, the overlapped portion between the second segment 524b of the common electrode 524 and the pixel electrode 517 has a smaller width than that in the remaining portion of the second segment 524b not overlapped with the pixel electrode 517. Thus, the second segment 524b of the common electrode 524 is overlapped with the pixel electrode 517 at a minimum of bonding margin.

Next, an inorganic insulating layer such as silicon oxide $SiO_x$ or silicon nitride $SiN_x$ is deposited on the entire surface of the substrate including the gate line 512 by PECVD (Plasma Enhanced Chemical Vapor Deposition), thereby forming the gate insulating layer ('513' of FIG. 11). Subsequently, amorphous silicon (a-Si:H) is deposited on the entire surface of the substrate including the gate insulating layer at a high temperature, and then the deposited amorphous silicon is patterned, whereby an island-shaped semiconductor layer 514 is formed on the gate insulating layer above the gate electrode. In addition, an overcoat layer may be formed on the semiconductor layer 514, to decrease the contact resistance to the source/drain electrodes. At this time, the overcoat layer may be formed of the amorphous silicon doped with impurities.

Figure 12B:
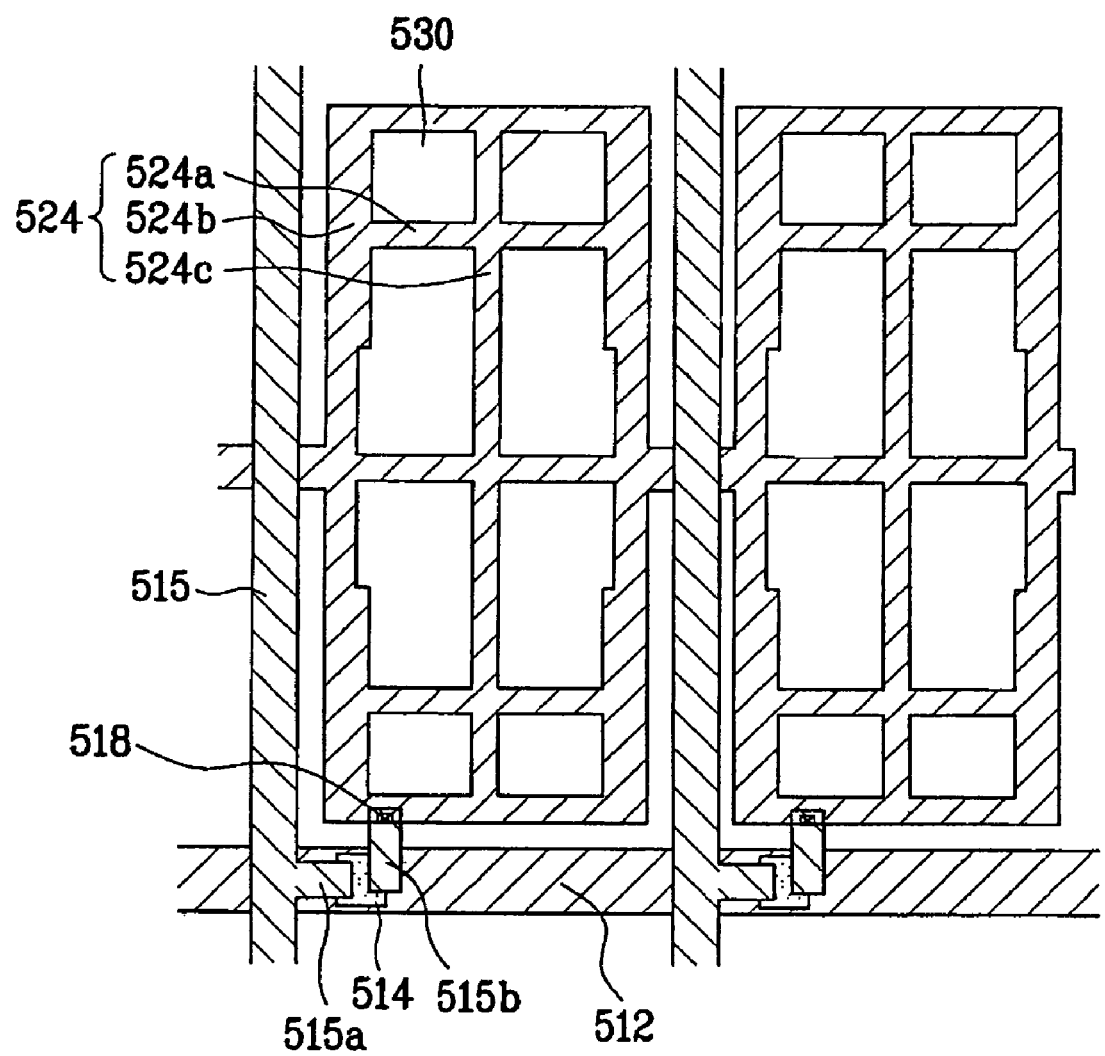
Figure 12C:
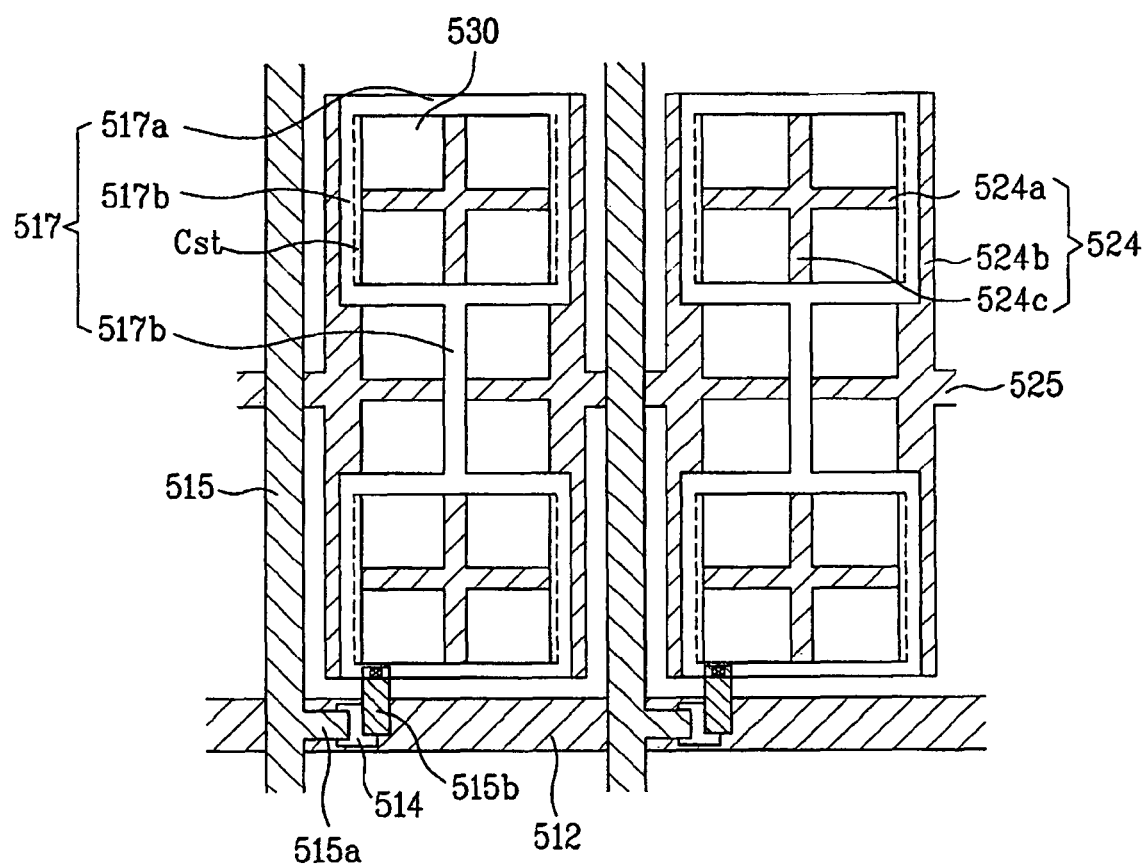

As shown in FIG. 12B, a metal layer such as copper Cu, aluminum Al, aluminum neodymium AlNd, molybdenum Mo, chrome Cr, titanium Ti, tantalum Ta or molybdenum-tungsten MoW is deposited on the entire surface of the substrate including the semiconductor layer 514, and then the deposited metal layer is patterned, thereby forming the plurality of data lines 515 and the source/drain electrodes 515a/515b. In this case, the data line 515 is formed substantially perpendicular to the gate line 512 to define the unit pixel region. Also, the source/drain electrodes 515a/515b are formed at both sides of the semiconductor layer 514. Thus, it is possible to form the thin film transistor TFT including the gate electrode, the gate insulating layer, the semiconductor layer 514 and the source/drain electrodes 515a/515b, for switching on/off the voltage applied to the unit pixel region. Next, an organic insulating layer, for example, BCB (BenzoCycloButene) or acrylic resin, may be coated on the entire surface of the substrate including the data line 515, or an inorganic insulating layer, for example, $SiN_x$ or $SiO_x$, may be deposited on the entire surface of the substrate including the data line 515, thereby forming the passivation layer ('516' of FIG. 11). Then, a contact hole 518 is formed by partially removing the passivation layer, wherein the drain electrode 515b is exposed by the contact hole 518.

As shown in FIG. 12C, a transparent conductive material layer of ITO (Indium-Tin-Oxide) or IZO (Indium-Zinc-Oxide) is deposited and patterned on the entire surface of the substrate including the passivation layer, thereby forming the pixel electrode 517 for being electrically connected with the drain electrode 515b through the contact hole 518. At this time, the pixel electrode 517 is formed to have the structure (the plurality of third and fourth segments) explained in FIG. 6 and FIG. 10. Accordingly, an edge in each block 530 is formed of the common electrode 524 and the pixel electrode 517 having a shape of "⌐" or "L". In this case, the overlapped portion between the common electrode 524 and the pixel electrode 517 forms the storage capacitor Cst.

Then, alignment layers are formed on the inner surfaces of the thin film transistor TFT array substrate and the color filter array substrate, and the alignment layers are rubbed. At this time, the rubbing direction is the initial alignment direction of the liquid crystal, wherein the alignment layers are rubbed in the horizontal direction or the vertical direction. After that, the thin film transistor TFT array substrate and the color filter array substrate are bonded to each other, and the liquid crystal layer is formed between the thin film transistor TFT array substrate and the color filter array substrate. The bonded substrates are cleaned, and then the first and second polarizing sheets are respectively adhered on the outer surfaces of the thin film transistor TFT array substrate and the color filter array substrate. In this state, the polarizing axes of the first and second polarizing sheets are perpendicular to each other, and any one polarizing axis is formed at the same direction as the initial alignment of the liquid crystal molecules.

However, the IPS mode LCD device having the electrode of the grid structure according to the first and second embodiments of the present invention has the following characteristics. That is, as the interval between the common electrode (124 or 524) and the pixel electrode (117 or 517) increases, the electric field becomes weak. As the interval between the common electrode and the pixel electrode decreases, the number of electrodes relatively increases, whereby the aperture ratio becomes low. In this respect, it is necessary to provide the appropriate interval between the common electrode and the pixel electrode, so that the width of the block (130 or 530) has the proper size according to the designing rule for the optimal interval between the electrodes. Since the size of the pixel region varies based upon the model of the LCD device, it optimal arrangement of the blocks may be difficult. In this case, the second segments (124b or 524b) of the common electrode (124 or 524) are formed at both sides in each pixel region, and the fourth segment (117b or 117c) of the pixel electrode (117 or 517) is interposed between the second segments (124b or 524b) of the common electrode (124 or 524) in parallel. As a result, the number of blocks, arranged along a horizontal direction of the pixel region, is limited to the even numbers. When applying the optimal interval between the electrodes, the even numbered blocks are formed along the horizontal direction of the pixel region. In this case, if there are the remaining portions in the pixel region, the aperture ratio is lowered due to the remaining portions in the pixel region. Accordingly, there is a requirement for forming odd numbered blocks as well as the even numbered blocks in the pixel region to optimize the aperture ratio of the device.

Figure 13:
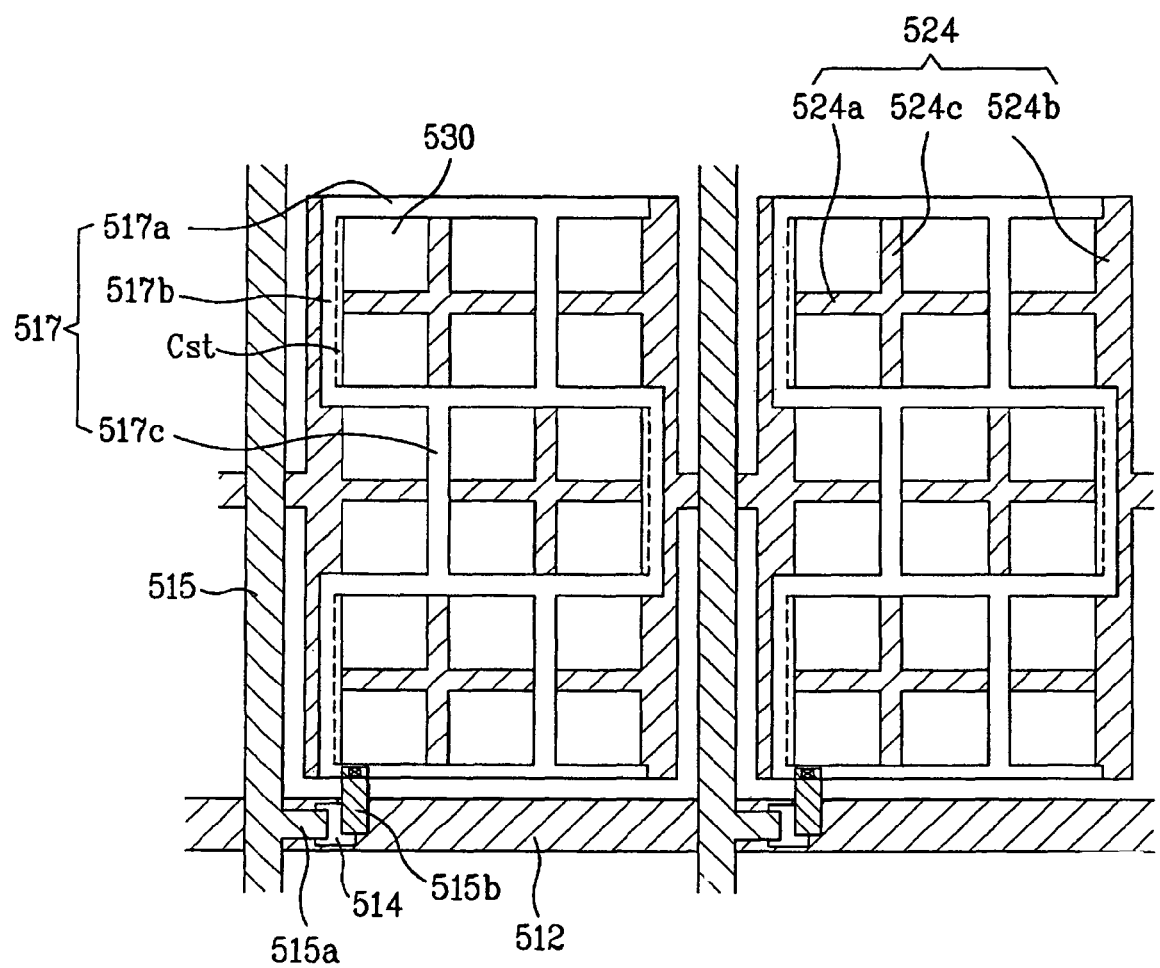
FIG. 13 is a plan view of an IPS mode LCD device according to the third embodiment of the present invention.

Hereinafter, an IPS mode LCD device according to the third embodiment of the present invention will be described as follows. FIG. 13 is a plan view of an IPS mode LCD device according to the third embodiment of the present invention. As shown in FIG. 6 or FIG. 10, if the pixel region is small, the two blocks are arranged along the horizontal direction of the pixel region. As shown in FIG. 13, if the pixel region is larger, then three blocks may be arranged along the horizontal direction of the pixel region. Furthermore, if the pixel region is larger than the pixel region shown in FIG. 13, a plurality of blocks may be arranged along the horizontal direction of the pixel region. The number of blocks arranged along the horizontal direction of the pixel region is determined according to the model of the LCD device. That is, even though the pixel region varies in size, it is possible to efficiently arrange the blocks in the pixel region by applying the optimal designing rule. Thus, there are no remaining portions in the pixel region, thereby obtaining the high aperture ratio.

The IPS mode LCD device according to the third embodiment of the present invention is similar in structure to the IPS mode LCD device according to the second embodiment of the present invention except that odd numbered blocks 530 are arranged along the horizontal direction of the pixel region. That is, a common electrode 524 includes a plurality of first segments 524a and a plurality of second segments 524b/524c. The plurality of first segments 524a are formed substantially parallel to a gate line 512. Also, the plurality of second segments 524b/524c are formed substantially parallel to a data line 515, wherein the second segments 524b/524c electrically connect the first segments 524a. The second segments 524b are positioned at both sides in each pixel region, whereby the second segments 524b are connected with both sides of the first segment 524a. Also, the second segments 524c are formed in the center of the pixel region and connected with the first segments 524a. The plurality of first segments 524a are formed substantially perpendicular to the plurality of second segments 524b/524c, thereby defining a plurality of blocks 530. In order to define the odd numbered blocks along the horizontal direction of the pixel region, the even numbered second segments 524c are formed in the pixel region.

In the meantime, a pixel electrode 517 includes a plurality of third segments 517a and a plurality of fourth segments 517b/517c. The plurality of third segments 517a are formed substantially parallel to the first segments 524a of the common electrode 524, wherein each third segment 517a is positioned between the first segments 524a of the common electrode 524. Also, the plurality of fourth segments 517b/517c are formed substantially parallel to the data line 515b to electrically connect the third segments 517a. The fourth segment 517b is connected with the two adjacent third segments 517a, and the fourth segment 517b is overlapped with the second segment 524b of the common electrode 524. Also, the fourth segment 517c is connected with the central parts in the two adjacent third segments 517a, and the fourth segment 517c is overlapped with the second segment 524c of the common electrode 524. That is, the pixel electrode 517 is formed in zigzag by the third segment 517a and the fourth segment 517b, and the fourth segment 517c is arranged in zigzag for being overlapped with one of the second segments 524c.

Accordingly, the odd numbered blocks 530 are arranged along the horizontal direction of the pixel region by the first and second segments 524a/524b/524c of the common electrode 524. Also, the pixel electrode 517 is partially overlapped with the predetermined portion of the common electrode 524, so that each block has an edge formed from the pixel electrode 517 in shape of "⌐" or "L". Furthermore, as illustrated in the drawings for explaining the third embodiment of the present invention, the same or like parts as those in the second embodiment of the present invention will be referred to as the same reference numbers.

Figure 14:
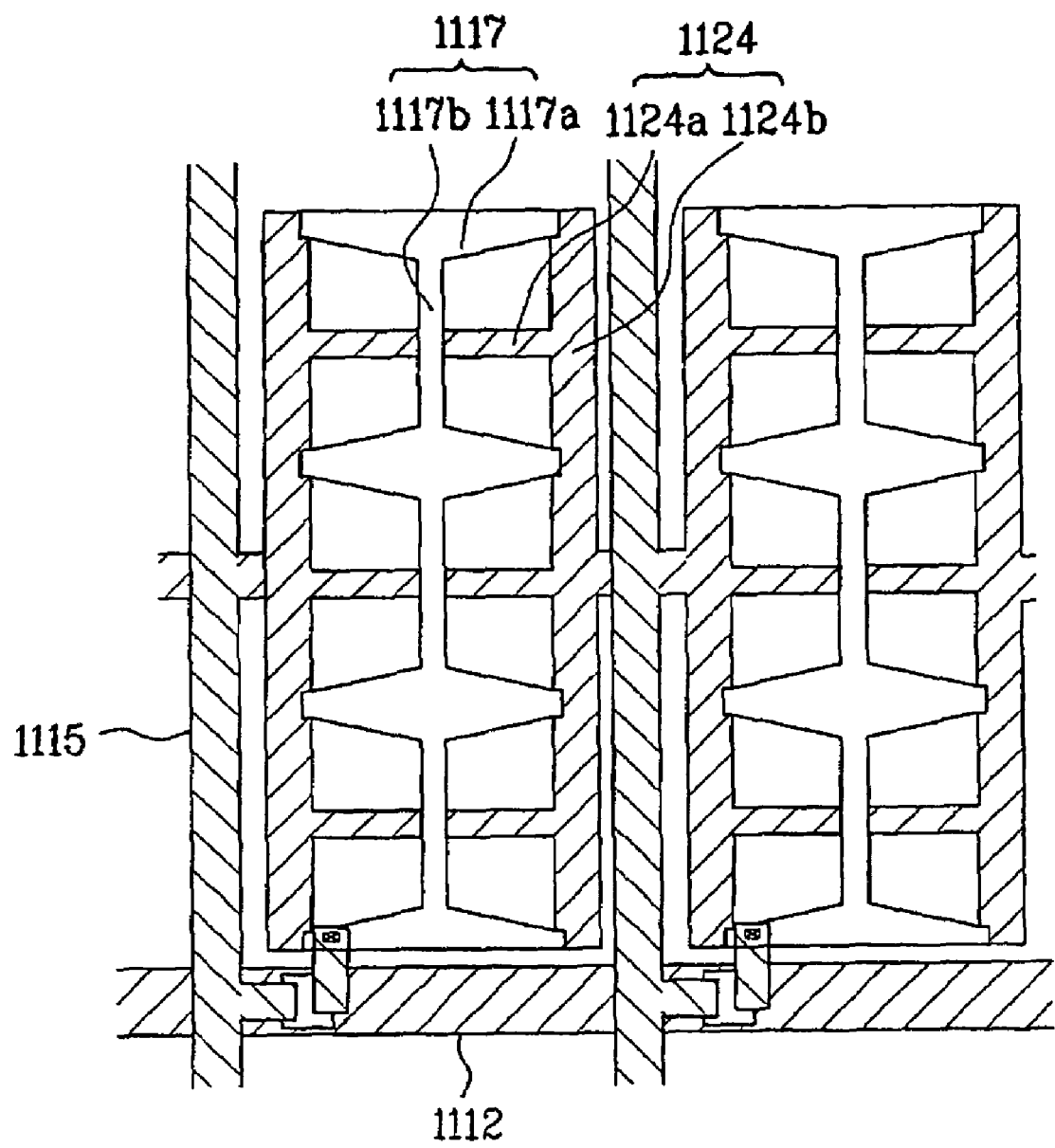
FIG. 14 is a plan view of an IPS mode LCD device according to the fourth embodiment of the present invention.
Figure 15:
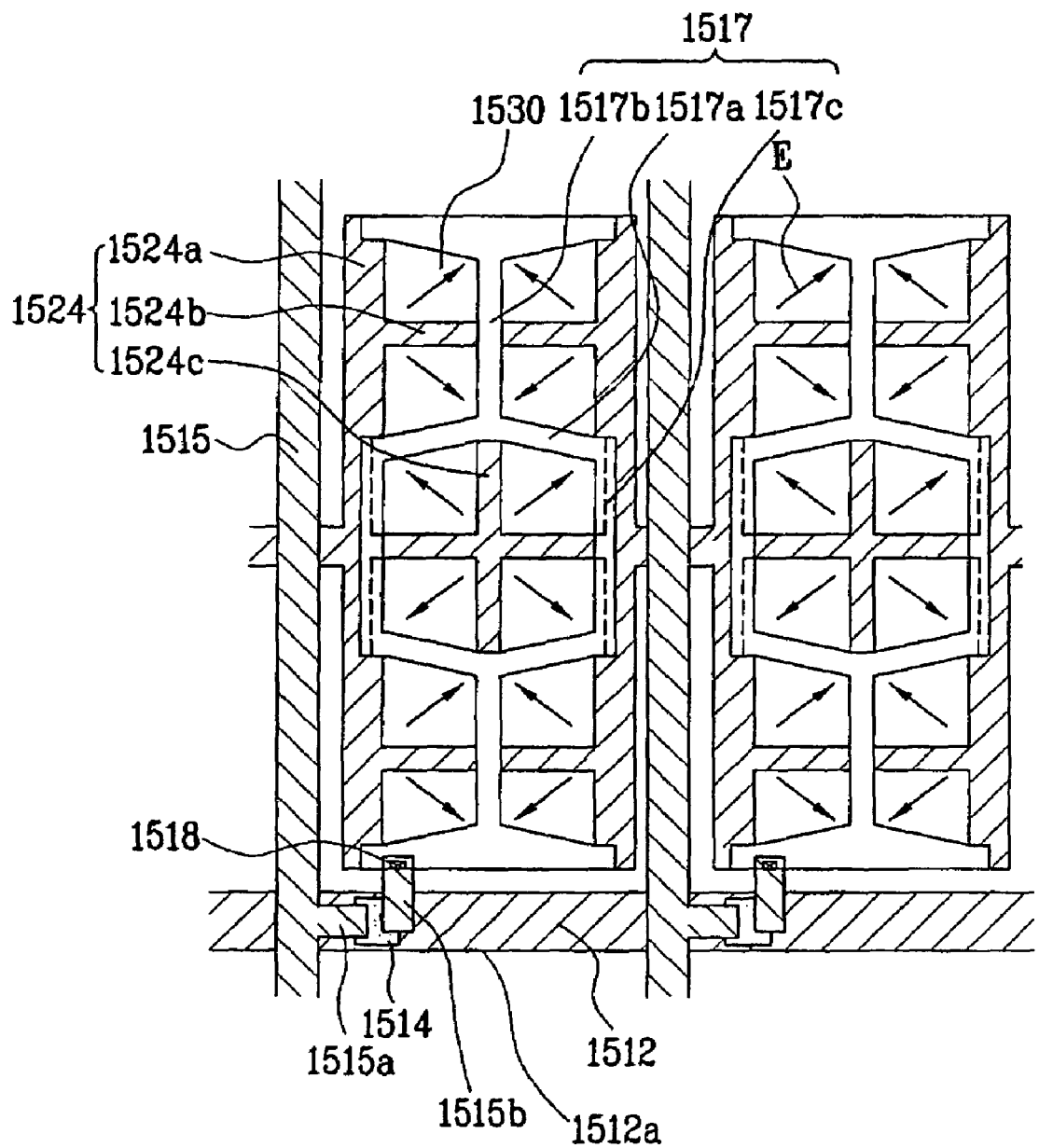
FIG. 15 is a plan view of an IPS mode LCD device according to the fifth embodiment of the present invention.
Figure 16:
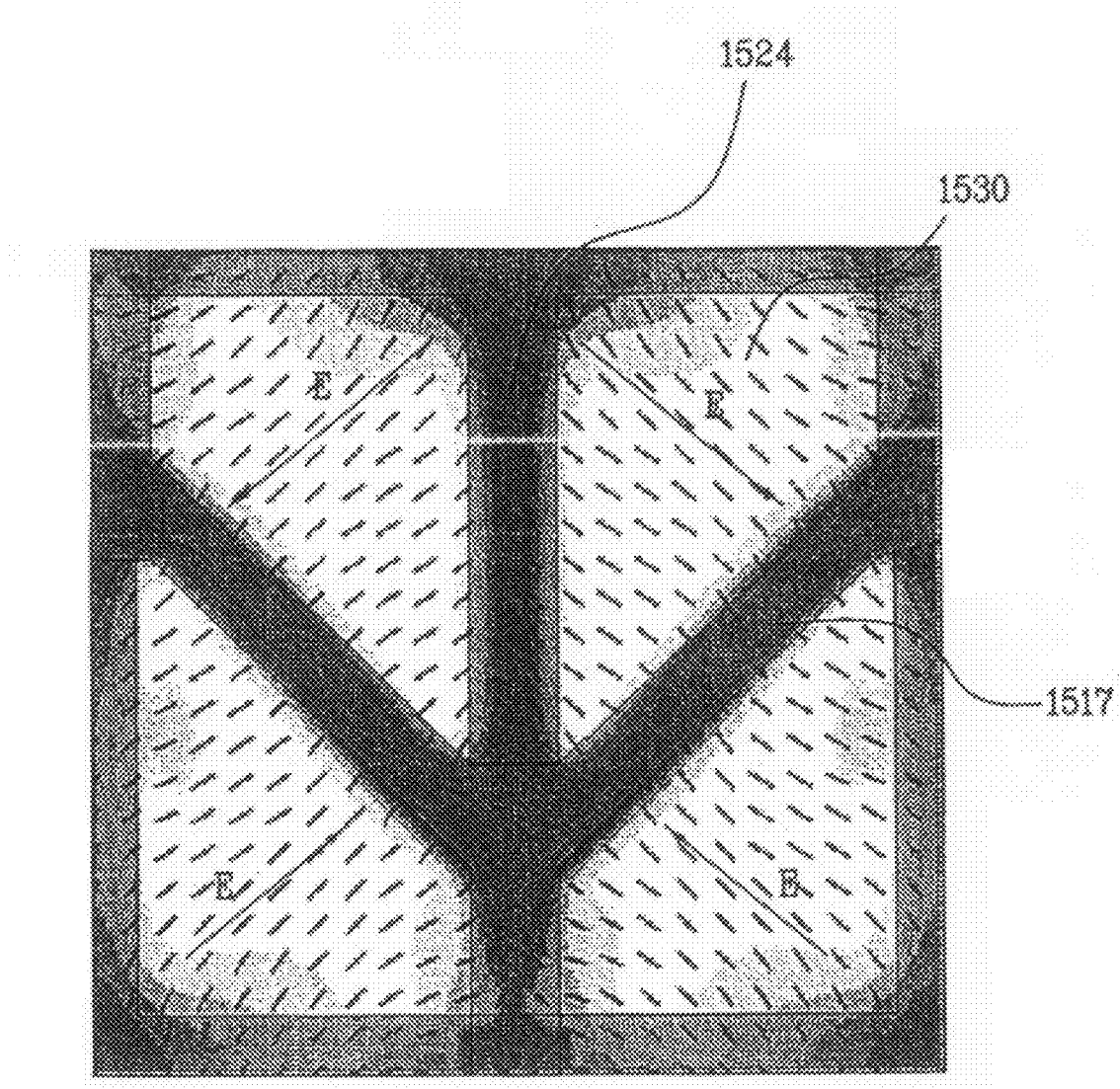
FIG. 16 illustrates an electric field formed between electrodes of a grid structure according to fourth and fifth embodiments of the present invention.
Figure 17:
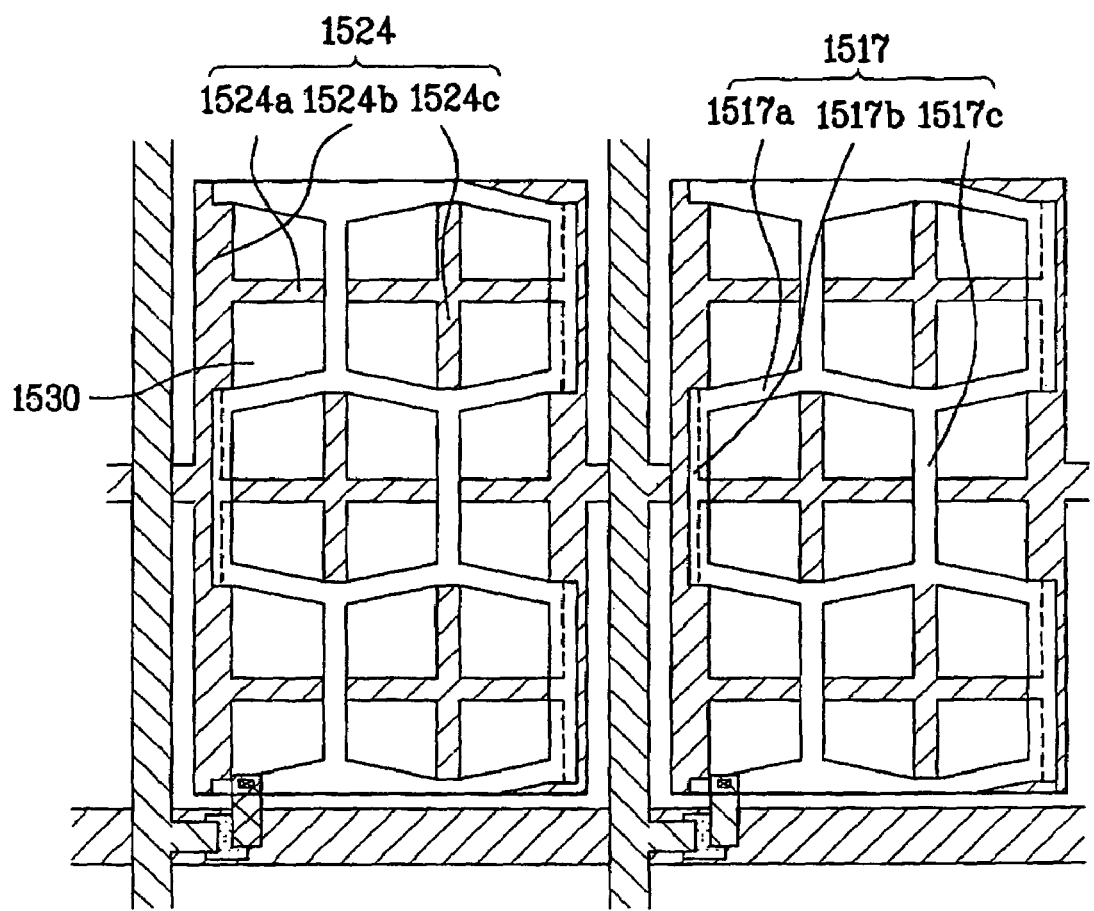
FIG. 17 is a plan view of an IPS mode LCD device according to a sixth embodiment of the present invention.

FIG. 14 is a plan view of an IPS mode LCD device according to the fourth embodiment of the present invention. FIG. 15 is a plan view of an IPS mode LCD device according to a fifth embodiment of the present invention. FIG. 16 illustrates an electric field formed between electrodes of a grid structure according to the fourth and fifth embodiments of the present invention. FIG. 17 is a plan view of an IPS mode LCD device according to the sixth embodiment of the present invention.

In the IPS mode LCD device having the electrode of the grid structure according to the first embodiment of the present invention, it has the problem of the slightly low transmittance. That is, as shown in FIG. 6, in case of the IPS mode LCD device according to the first embodiment of the present invention, an equipotential surface is generated at the corner where the common electrode 124 and the pixel electrode 117 are bent. At the corner of the block, the common electrode 124 is distant from the pixel electrode 117, so that the electric field becomes weak. As a result, it is difficult to control the liquid crystal molecules in the desired direction, whereby the transmittance of the device is lowered. Also, even though the electric field is formed at the direction of 45°, it has the problem of controlling the rotation of the liquid crystal molecules positioned adjacent to the alignment layer to the desired direction, due to the anchoring effect on the surface of the alignment layer. Thus, it is necessary to apply a high voltage to obtain the average rotation radius of the liquid crystal molecules close to 45°. In an experiment when 7V was applied, the mode efficiency of the LCD device is about 73.4%. Accordingly, to improve the electric field effect at the corner where the electrode is bent, as shown in FIG. 14, an IPS mode LCD device according to the fourth embodiment of the present invention has a pixel electrode 1117 having one inclined side so that a common electrode 1124 is positioned close to the pixel electrode 1117 at the corner.

In each pixel region, the common electrode 1124 includes a plurality of first segments 1124a and a plurality of second segments 1124b. The plurality of first segments 1124a are formed at fixed intervals in parallel to a gate line 1112. Also, the plurality of second segments 1124b are formed in parallel to a data line 1115, wherein the plurality of second segments 1124b are connected with the first segments 1124a. In the EPS mode LCD device according to the fourth embodiment of the present invention, the two second segments 1124b are connected with both sides of the first segment 1124a. Then, the pixel electrode 1117 includes a plurality of third segments 1117a and at least one fourth segment 1117b. The third segments 1117a are formed in parallel to the gate line 1112, wherein each third segment 1117a is positioned between the respective first segments 1124a of the common electrode 1124. Also, at least one fourth segment 1117b connects the third segments 1117a to one another, and the fourth segment 1117b is formed between the second segments 1124b in parallel. In this state, the third segment 1117a of the pixel electrode 1117 has the widest central part being connected with the fourth segment 1117b. That is, as the third segment 1117a of the pixel electrode 1117 goes to the both end parts, the third segment 1117a of the pixel electrode 1117 becomes narrower.

Accordingly, the fourth segment 1117b of the pixel electrode 1117 is positioned between the second segments 1124b of the common electrode 1124. Also, the third segment 1117a of the pixel electrode 1117 may be formed in a diamond pattern between the first segments 1124a of the common electrode 1124. The IPS mode LCD device according to the fourth embodiment of the present invention is similar in structure to the IPS mode LCD device according to the first embodiment of the present invention. Also, in a case of the IPS mode LCD device according to the second embodiment of the present invention, the electric field is weak since the common electrode 524 is distant from the pixel electrode 517 at the corner. Thus, the transmittance of the device may be lowered since it is difficult to control the rotation of the liquid crystal molecules to the desired direction. Accordingly, when the pixel electrode has one inclined side, the area of the inclined corner is minimized, thereby improving the electric field effect and the aperture ratio.

Hereinafter, an IPS mode LCD device according to the fifth embodiment of the present invention will be described as follows. As shown in FIG. 15, a plurality of gate lines 1512 and a plurality of data lines 1515 are formed on a substrate, wherein each gate line 1512 is positioned in perpendicular to each data line 1515 to define a pixel region. Then, a thin film transistor TFT is formed at a crossing point of the gate line 1512 and the data line 1515, wherein the thin film transistor TFT is comprised of a semiconductor layer 1514, and source/drain electrodes 1515a/1515b. Also, a common electrode 1524 is formed in each pixel region, wherein the common electrode 1524 divides each pixel region into blocks in a matrix type. In addition, a pixel electrode 1517, having an inclined part for defining sub-blocks 1530 by dividing the block, is formed wherein the pixel electrode 1517 is partially overlapped with the common electrode 1524, thereby forming a storage capacitor.

More specifically, the common electrode 1524 includes a plurality of first segments 1524a and a plurality of second segments 1524b/1524c. At this time, the plurality of first segments 1524a are formed in parallel to the gate line 1512. Also, the plurality of second segments 1524b/1524c are formed in parallel to the data line 1515, wherein the second segments 1524b/1524c electrically connect the first segments 1524a. In this state, the plurality of first segments 1524 are formed in perpendicular to the plurality of second segments 1524b/1524c, thereby defining the plurality of blocks. The second segments 1524b are formed at both sides in each pixel region, and the second segment 1524c is formed in the central part of the pixel region.

In this case, the second segments 1524b of the common electrode, positioned at both sides in each pixel region are overlapped with the adjacent data line 1515, thereby preventing the light leakage in the edge of the data line 1515, and improving the aperture ratio. Also, the second segments 1524b of the common electrode 1524 are positioned at both sides in each pixel region such that the overlapped portion between the second segment 1524b of the common electrode 1524 and the pixel electrode 1517 is maintained at a minimum, whereby the overlapped portion between the second segment 1524b and the pixel electrode 1517 has a smaller width than that in the remaining portion of the second segment 1524b not overlapped with the pixel electrode 1517.

The pixel electrode 1517 includes a plurality of third segments 1517a and a plurality of fourth segments 1517b/1517c. At this time, the plurality of third segments are formed perpendicular to the first segments 1524a, wherein each third segment 1517a is formed between the first segments 1524a of the common electrode 1524. Also, the plurality of fourth segments 1517b/1517c are formed in parallel to the data line 1515, wherein the fourth segments 1517b/1517c electrically connect the third segments 1517a. In this state, the fourth segment 1517b is connected with the two adjacent third segments 1517a, and the fourth segment 1517b is partially overlapped with the second segment 1524b of the common electrode 1524. When the fourth segment 1517c is connected to the central parts in the two adjacent third segments 1517a, the fourth segment 1517c is overlapped with the second segment 1524c of the common electrode 1524. In this state, the third segment 1517a is formed to have an inclined shape having a constant width. That is, the first segment 1524a of the common electrode 1524 is formed in perpendicular to the second segment 1524b of the common electrode 1524, thereby defining the rectangular block. Thus, the second segment 1524b prevents the light from leaking in the edge of the data line 1515.

The third segment 1517a of the pixel electrode 1517 is slantingly formed to divide the block into the trapezoidal sub-blocks 1530. That is, the sub-blocks 1530 are formed in a trapezoidal shape, i.e., the first and second segments 1524a/1524b/1524c of the common electrode 1524 are formed at an angle of 90°, and the third and fourth segments 1517a/1517b/1517c of the pixel electrode 1517 are formed at the angle above 90°. Also, the trapezoidal sub-blocks 1530 are symmetric with respect to the common electrode 1524.

As shown in FIG. 16, when a voltage of a predetermined value is applied to the common electrode 1524 and the pixel electrode 1517, the electric field E is formed at a direction to realize the maximum transmittance. In this state, even if a voltage above the predetermined value is applied to the common electrode 1524 and the pixel electrode 1517, the direction of the electric field E is constant. Accordingly, it is possible to maintain the maximum transmittance even in a case of applying the high voltage to the common electrode 1524 and the pixel electrode 1517. Also, the third segment 1517a of the pixel electrode 1517 is formed slantingly, so that the interval between the common electrode 1524 and the pixel electrode 1517 becomes shorter, thereby maximizing the electric field effect. In addition, as the equipotential area of the corner decreases, it is possible to increase the average rotation radius of liquid crystal director, thereby improving the transmittance of the LCD device. Thus, if, for example, the pixel electrode is formed slantingly, when a voltage of 7V is applied, the efficiency of the mode device goes up to 83.2%.

Also, the respective sub-blocks 1530 have the different electric field directions, so that liquid crystal molecules are re-aligned at the different directions, thereby realizing the multi-domain effect by compensating a main viewing angle. Then, the overlapped portion between the common electrode 1524 and the pixel electrode 1517 forms a storage capacitor by the common electrode 1524 and the pixel electrode 1517, wherein the common electrode 1524 functions as a capacitor lower electrode, and the pixel electrode 1517 functions as a capacitor upper electrode that is insulated from the common electrode 1524. The IPS mode LCD device according to the fifth embodiment of the present invention is similar in structure to the IPS mode LCD device according to the second embodiment of the present invention. Meanwhile, in a case of the IPS mode LCD device according to the third embodiment of the present invention explained with reference to FIG. 13, since the common electrode 524 is distant from the pixel electrode 517 at the corner, the electric field is weak so that the transmittance of the device may be lowered in that it is difficult to control the rotation of the liquid crystal molecules to the desired direction. Accordingly, in a state the pixel electrode has one inclined side, the area of the inclined corner is minimized, thereby improving the electric field effect and the aperture ratio. Hereinafter, an IPS mode LCD device according to the sixth embodiment of the present invention will be described as follows.

As shown in FIG. 17, common and pixel electrodes are formed by a combination of FIG. 13 and FIG. 15 to form odd numbered sub-blocks 1530 along the horizontal direction of the pixel region. That is, the odd numbered sub-blocks 1530 of a rectangular shape are formed along the horizontal direction of the pixel region by crossing first and second segments 1524a/1524b/1524c of the common electrode 1524 to each other. Also, a third segment 1517a of the pixel electrode 1517 is positioned between the first segments 1524a of the common electrode 1524. In addition, the third segment 1517a of the pixel electrode 1517 is overlapped with the second segments 1524b/1524c of the common electrode 1524. Then, fourth segments 1517b/1517c of the pixel electrode 1517 are formed to connect the adjacent third segments.

The third segment 1517a of the pixel electrode 1517 has a slanting shape with respect to a point being connected with the fourth segment 1517b/1517c. Accordingly, each sub-block has the edge formed by the common electrode 1524 in a shape of "⌐" or "∟" and the pixel electrode 1517 formed at the angle above 90°. The inclined third segment 1517a is interposed between the first segments 1524a of the common electrode 1524 to divide each block into the sub-blocks 1530. Also, the fourth segments 1517b/1517c are formed in shape of connecting the third segments 1517a in zigzag.

In the IPS mode LCD devices according to the fifth and sixth embodiments of the present invention, the number of sub-blocks arranged along the horizontal direction of the pixel region may be varied according to the size of the pixel region. That is, in case the pixel region is small, as shown in FIG. 15, the two sub-blocks 1530 are arranged along the horizontal direction of the pixel region. If the pixel region is large, as shown in FIG. 17, the three sub-blocks 1530 are arranged along the horizontal direction of the pixel region. Furthermore, if the pixel region is larger than one shown in FIG. 17, a plurality of blocks are arranged along the horizontal direction of the pixel region. Thus, the number of sub-blocks, arranged along the horizontal direction of the pixel region may be determined according to the model of the LCD device.

As described above, the IPS mode LCD device and the method for manufacturing the same have the following advantages.

In the IPS mode LCD device according to the present invention, the plurality of blocks are defined in each pixel region by the common electrode and the pixel electrode. Thus, even though a voltage above the predetermined value is applied to the device, it is possible to stably maintain the maximum transmittance.

Also, the segments of the common electrode are arranged at both sides in the pixel region, and the optimal interval is maintained between the common electrode and the pixel electrode so that it is possible to arrange odd or even numbered blocks in the pixel region according to the size of the pixel region. Accordingly, even though the pixel region varies in size, it is possible to realize high aperture ratio by the optimal designing rule.

In addition, the pixel region has the inclined side, whereby the corner where the pixel electrode is bent has the angle inclined gently. As a result, the equipotential area is minimized at the corner, thereby increasing the average rotation radius of the liquid crystal director. Also, since the pixel electrode has the inclined side, it is possible to decrease the interval between the common electrode and the pixel electrode, thereby maximizing the electric field effect. Accordingly, it is possible to improve the transmittance in the LCD panel.

Furthermore, the pixel electrode has the inclined side having the constant width, to form the inclined corner, so that the area of the pixel electrode is decreased, thereby improving the aperture ratio.

Also, the storage capacitance generates by the overlapped portion between the common electrode and the pixel electrode. In this respect, there is no requirement for providing the additional storage capacitor on the gate line, or for increasing the area of the capacitor electrode to obtain more capacitance. Accordingly, it is possible to prevent the aperture ratio from being lowered by the additional storage capacitor.

The respective blocks have the different electric field directions, so that the liquid crystal molecules are re-aligned at the different directions, thereby obtaining the multi-domain effect by compensating the viewing angle.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for manufacturing an IPS mode LCD device, comprising:

forming a gate line on a substrate;

forming a common electrode including a plurality of first segments and a plurality of second segments in a pixel region, wherein the plurality of first segments are formed substantially parallel to the gate line, and the plurality of second segments are formed substantially perpendicular to the gate line and connected to the first segments;

forming a gate insulating layer on an entire surface of the substrate including the gate line and the common electrode;

forming a semiconductor layer on the gate insulating layer;

forming a data line substantially perpendicular to the gate line, and forming source/drain electrodes overlapped with sides of the semiconductor layer;

forming a passivation layer on the entire surface of the substrate including the data line, wherein the passivation layer has a contact hole on the drain electrode; and forming a pixel electrode including a plurality of third segments and at least one fourth segment on the passivation layer connected with the drain electrode, wherein each of the third segments is positioned between the first segments, and the at least one fourth segment includes one segment connecting end parts of two adjacent third segments and being partially overlapped with the second segments of the common electrode to form a closed loop.

2. The method of claim 1, further comprising forming a common line connecting the common electrodes of adjacent pixel regions.

3. The method of claim 1, wherein the plurality of second segments are provided to connect end parts of the first segments.

4. The method of claim 3, wherein the plurality of second segments further includes at least one segment connecting central parts of the first segments.

5. The method of claim 1, wherein the at least one fourth segment of the pixel electrode is partially overlapped with the second segments of the common electrode to form a storage capacitor.

6. The method of claim 5, wherein one portion of the second segments of the common electrode, being overlapped with the at least one fourth segment, has a smaller width than a remaining portion of the second segments not overlapped with the at least one fourth segment.

7. The method of claim 1, wherein the at least one fourth segment further includes another segment for connecting central parts of the two adjacent third segments.

8. The method of claim 1, wherein a central part of the third segments is connected with the at least one fourth segment, and a portion of the third segments connected with the at least one fourth segment is wider than the end parts of the third segments.

9. The method of claim 1, wherein the third segments are formed in an inclined shape having a constant width.

10. The method of claim 1, wherein the common electrode is symmetric with the pixel electrode.

11. The method of claim 1, wherein the pixel electrode is extended to the gate line to form a storage capacitor.

12. The method of claim 1, wherein sub-blocks are defined with the common electrode and the pixel electrode, and each sub-block is formed of the common electrode having a shape of "⌐" and the pixel electrode having a shape of "L", or each sub-block is formed of the common electrode having a shape of "L" and the pixel electrode having a shape of "⌐".

13. The method of claim 12, wherein each sub-block is formed in a regular tetragonal shape or a rectangular shape.

14. The method of claim 12, wherein at least two sub-blocks are arranged in a direction of the gate line.

15. The method of claim 12, wherein the respective sub-blocks have a same size.

16. The method of claim 12, wherein the respective sub-blocks are symmetric with respect to the common electrode.

17. The method of claim 12, wherein the sub-blocks are formed in a trapezoidal shape.

18. The method of claim 12, wherein the sub-blocks have an edge formed by the common electrode in the shape of "⌐" or "L" and the pixel electrode formed at an angle above 90 degree.

19. The method of claim 12, wherein a number of the sub-blocks arranged along a horizontal direction of the pixel region is determined according to a model of the LCD device.

20. The method of claim 1, wherein the pixel electrode is formed of a transparent conductive material.

21. The method of claim 19, wherein odd-numbered or even-numbered blocks sub-blocks of the number of sub-blocks are positioned in the pixel region along the gate line.

* * * * *